(12) United States Patent
Kalina

(10) Patent No.: US 8,695,344 B2
(45) Date of Patent: *Apr. 15, 2014

(54) SYSTEMS, METHODS AND APPARATUSES FOR CONVERTING THERMAL ENERGY INTO MECHANICAL AND ELECTRICAL POWER

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 1053 days.

This patent is subject to a terminal disclaimer.

(21) Appl. No.: 12/698,357

(22) Filed: Feb. 2, 2010

(65) Prior Publication Data

US 2010/0205962 A1    Aug. 19, 2010

Related U.S. Application Data

(63) Continuation-in-part of application No. 12/259,094, filed on Oct. 27, 2008, now Pat. No. 7,980,079, and a continuation-in-part of application No. 12/630,705, filed on Dec. 3, 2009, now Pat. No. 8,464,532.

(51) Int. Cl.
    *F01K 25/06* (2006.01)
(52) U.S. Cl.
    USPC .................. 60/649; 60/651; 60/653; 60/671; 60/673
(58) Field of Classification Search
    USPC .............................. 60/649, 651, 671, 653, 673
    See application file for complete search history.

(56) References Cited

U.S. PATENT DOCUMENTS

| | | |
|---|---|---|
| 3,146,761 A | 9/1964 | Blodgett |
| 3,660,980 A | 5/1972 | Knirsch et al. |
| 3,696,587 A | 10/1972 | Young et al. |
| 3,712,073 A | 1/1973 | Arenson |
| 3,867,907 A | 2/1975 | Marsch et al. |
| 3,979,914 A | 9/1976 | Weber |
| 4,010,246 A | 3/1977 | Steinrotter et al. |
| 4,164,849 A | 8/1979 | Mangus |
| 4,183,225 A | 1/1980 | Politte et al. |
| 4,324,102 A | 4/1982 | Woinsky |
| 4,326,581 A | 4/1982 | Rapier |

(Continued)

FOREIGN PATENT DOCUMENTS

| | | |
|---|---|---|
| DE | 3933731 A1 | 4/1990 |
| EP | 1331444 A | 7/2003 |

(Continued)

OTHER PUBLICATIONS

U.S. Appl. No. 11/227,991, filed Sep. 15, 2005, Kalina.

(Continued)

*Primary Examiner* — Hoang Nguyen
(74) *Attorney, Agent, or Firm* — Robert W Strozier

(57) ABSTRACT

The present invention discloses systems and methods for converting heat from external heat source streams or from solar energy derived from a solar collector subsystem. The systems and methods comprise a thermodynamic cycle including three internal subcycles. Two of the subcycles combine to power a higher pressures turbine and third or main cycle powers a lower pressure turbine. One of the cycles increases the flow rate of a richer working solution stream powering the lower pressure turbine. Another one of the cycles is a leaner working solution cycle, which provides increased flow rate for leaner working solution stream going into the higher pressure turbine.

24 Claims, 4 Drawing Sheets

(56) References Cited

U.S. PATENT DOCUMENTS

| | | | |
|---|---|---|---|
| 4,346,561 A | 8/1982 | Kalina | 60/673 |
| 4,433,545 A | 2/1984 | Chang | |
| 4,442,679 A | 4/1984 | Stafford et al. | |
| 4,489,563 A | 12/1984 | Kalina | 60/673 |
| 4,548,043 A | 10/1985 | Kalina | 60/673 |
| 4,586,340 A | 5/1986 | Kalina | 60/673 |
| 4,604,867 A | 8/1986 | Kalina | 60/653 |
| 4,619,809 A | 10/1986 | Schluderberg | |
| 4,674,285 A | 6/1987 | Durrant et al. | |
| 4,704,877 A | 11/1987 | Selcukoglu | |
| 4,732,005 A | 3/1988 | Kalina | 60/673 |
| 4,739,713 A | 4/1988 | Vier et al. | |
| 4,753,758 A | 6/1988 | Miller | |
| 4,763,480 A | 8/1988 | Kalina | 60/649 |
| 4,817,392 A | 4/1989 | Agrawal et al. | |
| 4,819,437 A | 4/1989 | Dayan | |
| 4,832,718 A | 5/1989 | Mehra | |
| 4,899,545 A | 2/1990 | Kalina | 60/673 |
| 4,982,568 A | 1/1991 | Kalina | 60/649 |
| 5,019,143 A | 5/1991 | Mehrta | |
| 5,029,444 A | 7/1991 | Kalina | 60/673 |
| 5,038,567 A | 8/1991 | Mortiz | |
| 5,095,708 A | 3/1992 | Kalina | 60/673 |
| 5,103,899 A | 4/1992 | Kalina | 165/104.13 |
| 5,440,882 A | 8/1995 | Kalina | 60/641.2 |
| 5,450,821 A | 9/1995 | Kalina | 122/1 R |
| 5,572,871 A | 11/1996 | Kalina | 60/649 |
| 5,588,298 A | 12/1996 | Kalina et al. | 60/676 |
| 5,603,218 A | 2/1997 | Hooper | |
| 5,649,426 A | 7/1997 | Kalina et al. | 60/649 |
| 5,754,613 A | 5/1998 | Hashiguchi et al. | |
| 5,784,888 A | 7/1998 | Termeuhlen | |
| 5,797,981 A | 8/1998 | Collin et al. | |
| 5,822,990 A * | 10/1998 | Kalina et al. | 60/649 |
| 5,893,410 A | 4/1999 | Halbrook | |
| 5,950,433 A | 9/1999 | Kalina | 60/649 |
| 5,953,918 A | 9/1999 | Kalina et al. | 60/653 |
| 6,015,451 A | 1/2000 | Anderson et al. | |
| 6,035,642 A | 3/2000 | Peletz et al. | |
| 6,058,695 A | 5/2000 | Ranasinghe et al. | |
| 6,065,280 A | 5/2000 | Ranasinghe et al. | |
| 6,155,052 A | 12/2000 | Hansen et al. | |
| 6,158,220 A | 12/2000 | Hansen et al. | |
| 6,158,221 A | 12/2000 | Fancher et al. | |
| 6,167,705 B1 | 1/2001 | Hansen et al. | |
| 6,170,263 B1 | 1/2001 | Chow et al. | |
| 6,195,998 B1 | 3/2001 | Hansen et al. | |
| 6,202,418 B1 | 3/2001 | Gabrielli et al. | |
| 6,223,535 B1 | 5/2001 | Kitz | |
| 6,347,520 B1 | 2/2002 | Ranasinghe et al. | |
| 6,435,484 B1 | 8/2002 | Uehara | |
| 6,464,492 B1 | 10/2002 | Guarco et al. | 432/91 |
| 6,735,948 B1 | 5/2004 | Kalina | 60/649 |
| 6,769,256 B1 | 8/2004 | Kalina | 60/653 |
| 6,820,421 B2 | 11/2004 | Kalina | 60/649 |
| 6,829,895 B2 | 12/2004 | Kalina | 60/649 |
| 6,910,334 B2 | 6/2005 | Kalina | 60/651 |
| 6,923,000 B2 | 8/2005 | Kalina | 60/649 |
| 6,941,757 B2 | 9/2005 | Kalina | 60/649 |
| 6,968,690 B2 | 11/2005 | Kalina | 60/649 |
| 7,021,060 B1 | 4/2006 | Kalina | 60/649 |
| 7,043,919 B1 | 5/2006 | Kalina | 60/651 |
| 7,055,326 B1 | 6/2006 | Kalina | 60/649 |
| 7,065,967 B2 | 6/2006 | Kalina | 60/649 |
| 7,065,969 B2 | 6/2006 | Kalina | 60/670 |
| 7,104,784 B1 | 9/2006 | Hasegawa et al. | 431/4 |
| 7,197,876 B1 | 4/2007 | Kalina | 60/649 |
| 7,264,654 B2 | 9/2007 | Kalina | 95/228 |
| 7,305,829 B2 * | 12/2007 | Mirolli et al. | 60/649 |
| 7,350,471 B2 | 4/2008 | Kalina | 110/348 |
| 7,398,651 B2 | 7/2008 | Kalina | 60/649 |
| 7,493,768 B2 | 2/2009 | Klaus et al. | |
| 7,509,794 B2 | 3/2009 | Bruckner et al. | |
| 7,516,619 B2 * | 4/2009 | Pelletier | 60/649 |
| 7,980,079 B2 * | 7/2011 | Kalina | 60/649 |
| 2003/0154718 A1 | 8/2003 | Nayar | |
| 2003/0167769 A1 | 9/2003 | Bharathan | |
| 2004/0050048 A1 | 3/2004 | Kalina | |
| 2004/0055302 A1 | 3/2004 | Kalina | |
| 2004/0069015 A1 | 4/2004 | Paradowski | |
| 2004/0069244 A1 | 4/2004 | Schroeder | |
| 2004/0148935 A1 | 8/2004 | Kalina | |
| 2004/0182084 A1 | 9/2004 | Kalina | |
| 2005/0050891 A1 | 3/2005 | Kalina | |
| 2005/0061654 A1 | 3/2005 | Kalina | 203/21 |
| 2005/0066661 A1 | 3/2005 | Kalina | |
| 2005/0183418 A1 | 8/2005 | Kalina | |
| 2005/0235645 A1 | 10/2005 | Kalina | |
| 2006/0096288 A1 | 5/2006 | Kalina | 60/649 |
| 2006/0096289 A1 | 5/2006 | Kalina | |
| 2006/0096290 A1 | 5/2006 | Kalina | 60/649 |
| 2006/0165394 A1 | 7/2006 | Kalina | 392/386 |
| 2006/0199120 A1 | 9/2006 | Kalina | 431/9 |
| 2007/0056284 A1 | 3/2007 | Kalina | |
| 2007/0068161 A1 | 3/2007 | Kalina | |
| 2007/0234722 A1 | 10/2007 | Kalina | |
| 2007/0234750 A1 | 10/2007 | Kalina | |
| 2008/0000225 A1 | 1/2008 | Kalina | |
| 2008/0053095 A1 | 3/2008 | Kalina | |
| 2010/0083662 A1 | 4/2010 | Kalina | |
| 2010/0101227 A1 | 4/2010 | Kalina | |
| 2010/0122533 A1 | 5/2010 | Kalina | |
| 2010/0146973 A1 * | 6/2010 | Kalina | 60/653 |
| 2010/0205962 A1 * | 8/2010 | Kalina | 60/641.8 |
| 2011/0024084 A1 | 2/2011 | Kalina | |
| 2011/0067400 A1 | 3/2011 | Kalina | |
| 2011/0174296 A1 | 7/2011 | Kalina | |

FOREIGN PATENT DOCUMENTS

| | | |
|---|---|---|
| EP | 1936129 A2 | 6/2008 |
| FR | 1111784 A | 3/1956 |
| FR | 2885169 A | 11/2006 |
| GB | 340780 A | 1/1931 |
| GB | 504114 A | 4/1939 |
| GB | 798786 A | 7/1958 |
| GB | 2335953 A | 10/1999 |
| JP | 61041850 A | 2/1986 |
| KR | 100846128 B1 | 7/2008 |
| WO | WO9407095 | 3/1994 |
| WO | WO0165101 | 9/2001 |
| WO | WO03048529 | 6/2003 |
| WO | WO2004109075 | 12/2004 |

OTHER PUBLICATIONS

U.S. Appl. No. 11/235,654, filed Sep. 22, 2005, Kalina.
U.S. Appl. No. 11/238,173, filed Sep. 28, 2005, Kalina.
U.S. Appl. No. 11/399,287, filed Apr. 5, 2006, Kalina.
U.S. Appl. No. 11/399,306, filed Apr. 5, 2006, Kalina.
U.S. Appl. No. 11/514,290, filed Aug. 31, 2006, Kalina.
PCT ISR and WO.

* cited by examiner

SYSTEMS, METHODS AND APPARATUSES FOR CONVERTING THERMAL ENERGY INTO MECHANICAL AND ELECTRICAL POWER

RELATED APPLICATIONS

A portion of this application is a Continuation-in-Part of U.S. patent application Ser. No. 12/259,094, filed 27 Oct. 2008 (Oct. 27, 2008) and a Continuation-in-Part of U.S. patent application Ser. No. 12/630,705, filed 3 Dec. 2009 (Dec. 3, 2009).

BACKGROUND OF THE INVENTION

1. Field of the Invention

Embodiments of the present invention relate to systems and methods for power generation by converting heat into mechanical and then electrical power or another form of useable energy.

Embodiments of the present invention relate systems and methods for power generation by converting heat into mechanical and then electrical power or another form of useable energy, where the systems and methods include a thermodynamic cycle including three interacting subcycles. The systems include either a heat recovery vapor generator subsystem utilizing a hot heat source stream or solar generator subsystem utilizing a heat transfer fluid to fully vaporize and superheat a richer and leaner working solution. The systems include a lower pressure turbine, a higher pressure turbine, at least six heat exchange units and the heat recovery vapor generator or at least nine heat exchange units and the solar generator subsystem. The systems also includes at least one separator or at least two separators and a scrubber and mixing and splitting valves for splitting and combining stream.

2. Description of the Related Art

In U.S. Pat. Nos. 5,095,708, and 5,572,871, power systems were presented that were designed to serve as bottoming cycles for combined cycle systems. These systems both had a specific feature which was the key to their high efficiency; both systems used intercooling of the working fluid in between turbine stages. Because the heat released during intercooling was recuperated, it was then used as an additional source of heating for the process of vaporization. This resulted in a drastic increase in the thermodynamical reversibility and correspondingly in higher efficiency of the power cycle.

However, in the prior art, this process of intercooling was performed in a special heat exchanger, a so-called "intercooler." Such an intercooler requires that the streams of working fluid in both the tubes and the shell of the intercooler be at high pressure. Moreover, the intercooled stream in the prior art is in the form of a vapor, and therefore the heat transfer coefficient from the vapor to the intercooler tubes is low. As a result, such an intercooler must be a very large and very expensive high pressure heat exchanger. This in turn has a very negative impact on the economics of the entire system.

Thus, there is a need in the art for a system designed to utilize high to medium temperatures sources to convert a potion of the thermal energy from these heat sources into electrical power.

SUMMARY OF THE INVENTION

CSQ-31

Embodiments of the present invention relate systems for power generation by converting heat into mechanical and then electrical power or another form of useable energy, where the systems establishes a thermodynamic cycle including three interacting subcycles. The systems include a heat generation subsystem comprising either a heat recovery vapor generator subsystem utilizing a hot heat source stream, a solar generator subsystem utilizing a heat transfer fluid or a solar generator subsystem directly to fully vaporize and superheat a richer and leaner working solution. The systems include a lower pressure turbine, a higher pressure turbine, at least six heat exchange units and the heat recovery vapor generator or at least three additional heat exchange units and the solar generator subsystem or the solar generator subsystem alone. The systems also includes at least one separator or at least two separators and a scrubber, four pumps for increasing a pressure of four streams, mixing and splitting valves for splitting and combining stream. The heat recovery heat recovery vapor generator or at least three additional heat exchange units and the solar generator subsystem or the solar generator subsystem alone supply the heat needed to fully vaporize and superheat the richer and leaner working solution stream.

Embodiments of the present invention relate systems and methods for power generation by converting heat into mechanical and then electrical power or another form of useable energy, where the systems and methods include a thermodynamic cycle including three interacting subcycles. The systems include either a heat recovery vapor generator subsystem utilizing a hot heat source stream, a solar generator subsystem utilizing a heat transfer fluid or a solar generator subsystem directly to fully vaporize and superheat a richer and leaner working solution. The systems include a lower pressure turbine, a higher pressure turbine, at least six heat exchange units and the heat recovery vapor generator or at least three additional heat exchange units and the solar generator subsystem or the solar generator subsystem alone. The systems also includes at least one separator or at least two separators and a scrubber, four pumps for increasing a pressure of four streams, mixing and splitting valves for splitting and combining stream. The method includes forming a thermodynamic cycle including three internal subcycles. The first internal cycle comprises circulating of a spent leaner working solution substream through a first heat exchange unit and either a heat recovery vapor generator or a solar collector subsystem directly or using a heat transfer fluid and into a higher pressure turbine to generate a first quantity of useable energy. The second internal cycle comprises circulating a upcoming leaner working solution stream through a second heat exchange unit, the first heat exchange unit and either the heat recovery vapor generator or the solar collector subsystem directly or using a heat transfer fluid and into the higher pressure turbine to generate the first quantity of useable energy. Thus, the first and second cycles utilize the leaner working solution which combine to generate the first quantity of useable energy. The third and main internal cycle comprises a basic rich solution stream, which passes through the three heat exchange units to vaporize and superheat the basic rich solution stream, which is then mixed with a leaner working solution substream to form a richer working solution stream. The richer working solution stream then passes through either a heat recovery vapor generator or a solar collector subsystem directly or using a heat transfer fluid and into a lower pressure turbine to generate a second quantity of useable energy. The first and second internal cycles reject their heat in such a way that it is fully recuperated by the third and main internal cycle, whereas heat rejected by the main internal cycle is reject into the ambient in the condenser heat exchange unit in counterflow with an external coolant stream.

CSQ-21

Embodiments of the present invention relate systems and methods for power generation by converting heat into mechanical and then electrical power or another form of useable energy, where the systems and methods include a thermodynamic cycle including three interacting subcycles. The systems include either a heat recovery vapor generator subsystem utilizing a hot heat source stream or solar generator subsystem utilizing a heat transfer fluid to fully vaporize and superheat a richer and leaner working solution. The systems include a lower pressure turbine, a higher pressure turbine, at least six heat exchange units and the heat recovery vapor generator or at least nine heat exchange units and the solar generator subsystem. The systems also includes at least one separator or at least two separators and a scrubber and mixing and splitting valves for splitting and combining stream.

Embodiments of the present invention relate systems and methods for power generation by converting heat into mechanical and then electrical power or another form of useable energy, where the systems and methods include a thermodynamic cycle including three interacting subcycles. The systems include either a heat recovery vapor generator subsystem utilizing a hot heat source stream or solar generator subsystem utilizing a heat transfer fluid to fully vaporize and superheat a richer and leaner working solution. The systems include a lower pressure turbine, a higher pressure turbine, at least six heat exchange units and the heat recovery vapor generator or at least nine heat exchange units and the solar generator subsystem. The systems also includes at least one separator or at least two separators and a scrubber and mixing and splitting valves for splitting and combining stream.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
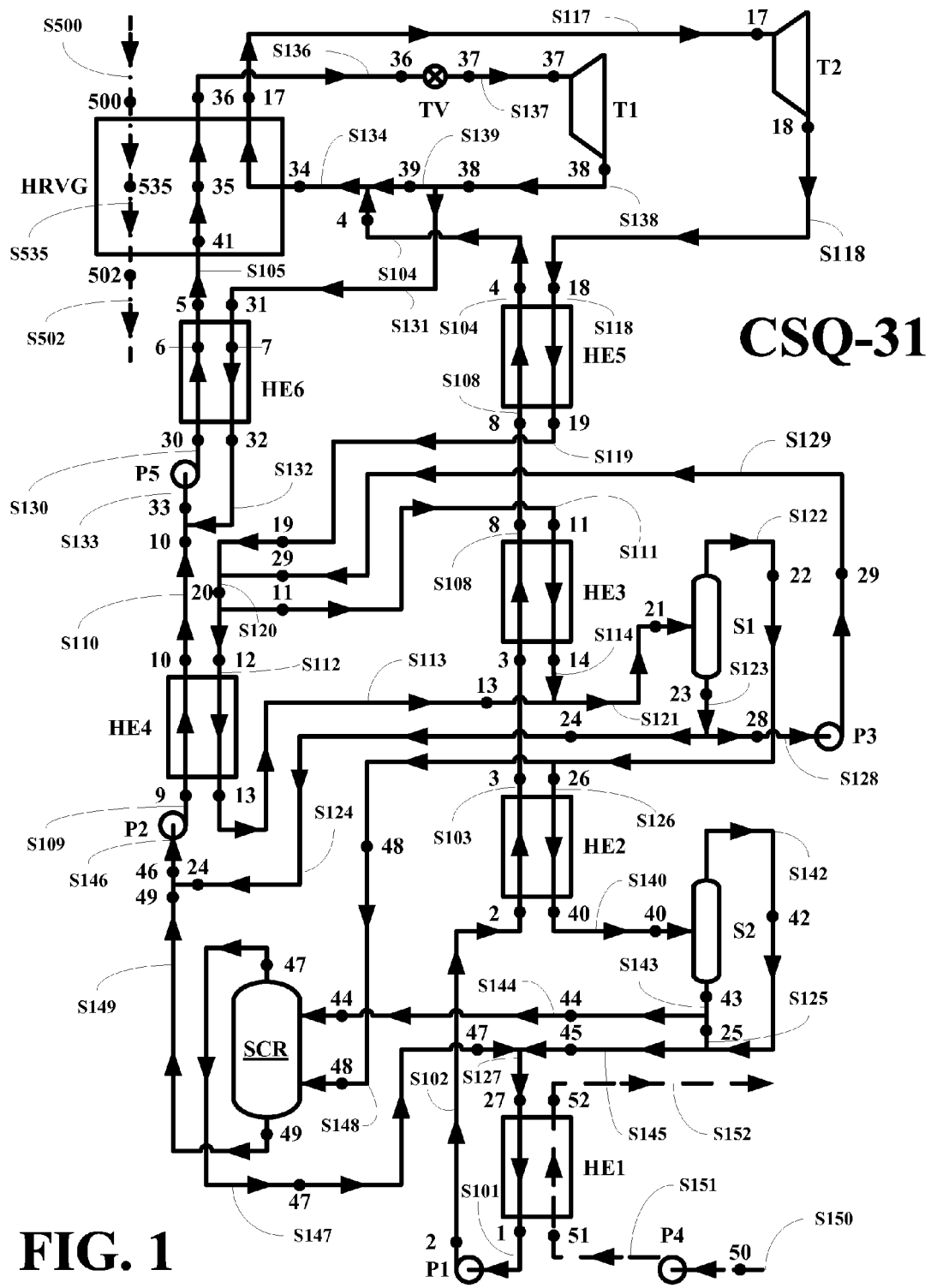
FIG. 1 depicts an embodiment of a system of this invention CSQ-31.

The inventor has found that a new and unique power generation system can be constructed using a multi-component working fluid including at least one lower boiling component and at least one higher boiling component, where the system and method comprises a thermodynamic cycle including three interacting subcycles.

All the streams used in the systems of this invention are derived from a single multi-component fluid having at least one lower boiling point component and at least on higher boiling point component. While all of the streams are derived from a single multi-component fluid, the composition of the streams can be the same or different. In embodiments of the present invention, there are at least six streams having different ratios of the at least one lower boiling point component to the at least one higher boiling point component. Streams having a higher concentration of the lower boiling point component compared to the higher boiling point component are referred to as rich solutions and streams that have a higher concentration of the higher boiling point component compared to the lower boiling point component are referred to as lean solutions. The multi-component fluids used in the systems of this inventions comprise at least one lower boiling point component—the low-boiling component—and at least one higher boiling point component—the high-boiling component. In certain embodiments, the multi-component fluids include an ammonia-water mixture, a mixture of two or more hydrocarbons, a mixture of two or more freon, a mixture of hydrocarbons and freon, or the like. In general, the multi-component fluids can comprise mixtures of any number of compounds with favorable thermodynamic characteristics and solubility. In other embodiments, the multi-component fluids comprise a mixture of water and ammonia.

The systems of this invention include heat exchange unit, pumps, separators, scrubbers, flow lines, splitting valves and mixing valve. It should be recognized by an ordinary artisan that at those point where a stream is split into two or more substreams, splitting valves are used to effect such stream splitting. These valves are well known in the art and can be manually adjustable or dynamically adjustable so that the splitting achieves the desired improved efficiency. The same is true for combining or mixing streams using mixing valves. Mixing valves are also well known in the art and can be manually adjustable or dynamically adjustable so that the mixing achieves a desired result such as full absorption of one stream into another stream.

Suitable heat transfer fluids for use in this invention include, without limitation, meltable salts, synthetic heat transfer fluids such as THERMINOL® (a registered trademark of Solutia Inc. Corporation) and DOWTHERM® (a registered trademark of Dow Chemicals Corporation), natural heat transfer fluids, other fluids capable of acting as a heat transfer fluid, and mixtures or combinations thereof.

Suitable working fluids for use in this invention include, without limitation, a multi-component working fluid including at least one lower boiling component and at least one higher boiling component. In certain embodiments, the working fluids include an ammonia-water mixture, a mixture of two or more hydrocarbons, a mixture of two or more freon, a mixture of hydrocarbons and freon, or the like. In general, the fluid can comprise mixtures of any number of compounds with favorable thermodynamic characteristics and solubility. In certain embodiments, the fluid comprises a mixture of water and ammonia.

DETAILED DESCRIPTION OF THE DRAWINGS

CSQ-31

Referring now to FIG. 1, an embodiment of the system and method of this invention, generally CSQ-31, is shown to include a fully condensed basic rich solution stream S101 having parameters as at a point 1. The stream S101 having the parameters as at the point 1 has a first composition of the multi-component fluid having a higher concentration of the lower boiling component and a concurrent lower concentration of the higher boiling component. The stream 101 is pumped through a feed pump P1 to form a higher pressure fully condensed basic rich solution stream S102 having parameters as at point 2, which corresponding to a state of subcooled liquid.

The higher pressure fully condensed basic rich solution stream S102 having the parameters as at the point 2 is then sent through a preheater or a second heat exchange unit HE2, where it is heated in counterflow with a vapor first S1 rich solution substream S126 having parameters as at a point 26 in a second heat exchange process 26-40 or 2-3 to form a preheated higher pressure basic rich solution stream S103 having parameters as at a point 3, which corresponds to a state of saturated liquid and a cooled, partially condensed first S1 rich substream S140 having parameters as at a point 40.

Thereafter, the preheated higher pressure basic rich solution stream S103 enters into a recuperative boiler-condenser or a third heat exchange unit HE3, where it is further heated and substantially vaporized (at least 80% vaporized) in counterflow with a first condensing solution substream S111 having parameters as at a point 11 in a third heat exchange process 11-14 or 3-8 to form a higher pressure substantially vaporized basic rich solution stream S108 having parameters as at a point 8 and a cooled first condensing solution substream S114 having parameters as at a point 14. The higher pressure substantially vaporized basic rich solution stream S108 corresponds to a state of a vapor-liquid mixture.

Thereafter, the higher pressure substantially vaporized basic rich solution stream S108 having the parameters as at the point 8 enters into a fifth heat exchange unit HE5, where it is further heated and fully vaporized and superheated, in counterflow with a spent richer working solution stream S118 having parameters as at a point 18 in a fifth heat exchange process 18-19 or 8-4 to form a higher pressure fully vaporized and superheated basic solution stream S104 having parameters as at a point 4 and a cooled spent richer working solution stream S119 having parameters as at a point 19.

Thereafter, the higher pressure fully vaporized and superheated basic rich solution stream S104 having the parameters as at the point 4 is combined with a first spent leaner working solution substream S139 having parameters as at a point 39 to form a richer working solution stream S134 having parameters as at a point 34, which corresponds to a state of superheated vapor. The spent leaner working solution S139 has a composition of the multi-component fluid, which is substantially leaner (i.e., contains a lower concentration of the lower boiling component) than the composition of the basic rich solution. A flow rate of the richer working solution stream S134 is substantially greater than a flow rate of the higher pressure fully vaporized and superheated basic rich solution stream S104 due to the addition of the first spent leaner working solution substream S139.

The richer working solution stream S134 now enters into a heat recovery vapor generator HRVG, where it is heated to form a fully vaporized and superheated richer working solution stream S117 having parameters as at a point 17, which corresponds to a state of superheated vapor.

The fully vaporized and superheated richer working solution stream S117 is then sent into a lower pressure turbine T2, where it is expanded and a portion of its heat is converted into power or other useable form of energy to form the spent richer working solution stream S118 having the parameters as at the point 18, still corresponding to a state of superheated vapor.

The spent richer working solution stream 5118 now passes through the fifth heat exchange unit HE5 as described above, where it is cooled, providing heat for the fifth heat exchange process 8-4 or 18-19 to form the cooled spent richer working solution stream S119 having the parameters as at the point 19, which corresponds to a state of slightly superheated vapor.

The cooled spent richer working solution stream S119 is then combined with a higher pressure S1 lean solution substream S129 having parameters as at a point 29, which corresponds to a state of subcooled liquid (as described below) to form a condensing solution stream S120 having parameters as at a point 20, corresponding to a state of saturated vapor. The condensing solution stream S120 is then divided into the first condensing solution substream S111 having parameters as at a point 11 and a second condensing solution substream S112 having parameters as at a point 12.

The first condensing solution substream S111 now passes through the third heat exchange unit HE3, where it is partially condensed, providing heat for the third heat exchange process 3-8 or 11-14 (as described above) to form the cooled first condensing solution substream S114 having the parameters as at the point 14, which corresponds to a state of a vapor-liquid mixture, i.e., a bi-phase state.

The second condensing solution substream S112, meanwhile, passes through a preheater or fourth heat exchange unit HE4, where it is partially condensed, providing heat for a fourth heat exchange process 9-10 or 12-13 (as described below) to form a cooled second condensing solution substream S113 having parameters as at a point 13, which corresponds to a state to a state of a vapor-liquid mixture, i.e., a bi-phase state, just as with the first condensing solution substream S114.

Thereafter, the cooled condensing solution substreams S113 and S114 are combined to form a combined partially condensed condensing solution stream S121 having parameters as at a point 21. The combined partially condensed condensing solution stream S121 is then sent into a first gravity separator S1, where it is separated into a saturated vapor S1 rich solution stream S122 having parameters as at a point 22 and a S1 lean solution stream S123 having parameters as at a point 23, which corresponds to a state of saturated liquid.

The S1 lean solution stream S123 is then divided into a first S1 lean solution substream S128 having parameters as at a points 28 and a second S1 lean solution substream S124 having parameters as at a point 24.

The first S1 lean solution substream S128 is then sent into a circulating pump or third pump P3, where its pressures is increased to a pressure equal to or substantially equal to a pressure of the cooled spent richer working solution stream S119 having the parameters as at the point 19, to form a higher pressure first S1 lean solution substream S129 having the parameters as at the point 29. The higher pressure first S1 lean solution substream S129 is now mixed with the cooled spent richer working solution stream S119 to form the condensing solution stream S120 having the parameters as at the point 20 (as described above.)

Meanwhile, the second S1 lean solution substream S124 is now mixed with a SCR lean solution stream S149 (as described below) to form a leaner working solution stream S146 having parameters as at a point 46. The leaner working solution stream S146 is now pumped by a booster pump or second pump P2, to an elevated pressure, to form a higher pressure leaner working solution stream S109 having parameters as at a point 9, which corresponds to a state of subcooled liquid.

The higher pressure leaner working solution stream S109 then enters into the fourth heat exchange unit HE4, where it is heated in counterflow with the second condensing solution substream S112 in the fourth heat exchange process 12-13 or 9-10 (as described above) to form a heated leaner working solution stream S110 having parameters as at a point 10. A pressure of the heated leaner working solution stream S110 having the parameters as at the point 10 is somewhat lower than a pressure of the higher pressure fully vaporized and superheated basic solution stream S104 having the parameters as at the points 4 and a spent leaner working solution stream S138 having parameters as at a point 38.

Thereafter, the heated leaner working solution stream S110 is mixed with a cooled second spent leaner working solution substream S132 having parameters as at a point 32 (as described below) to form an increased flow rate, leaner working solution stream S133 having parameters as at a point 33.

At this point, the cooled second spent leaner working solution substream S132 is in a state of a bi-phase liquid-vapor mixture, whereas the heated leaner working solution stream S110 is a state of subcooled liquid. As a result of mixing the streams S110 and S132, the stream S110 fully absorbs the stream S132, forming the increased flow rate, leaner working solution stream S133 having the parameters as the point 33, which corresponds to a state of saturated or slightly subcooled liquid.

Thereafter, the increased flow rate, leaner working solution stream S133 is pumped by a high pressure pump or five pump P5 to a desired higher pressure to form a higher pressure leaner working solution stream S130 having parameters as at a point 30, which corresponds to a state of subcooled liquid.

The higher pressure leaner working solution stream S130 now enters into a sixth heat exchange unit HE6, where it is heated in counterflow with a second spent leaner working solution substream S131 having parameters as at a point 31 in a sixth heat exchange process 31-32 or 31-7 and 7-32 or 30-5 or 30-6 and 6-5 (as described below) to form a heated higher pressure leaner working solution stream S105 having parameters as at a point 5, which still corresponds to a state subcooled liquid.

Thereafter, the heated higher pressure leaner working solution stream S105 is sent into a heat recovery vapor generator HRVG, where it is heated, fully vaporized and superheated, in counterflow with a heat source stream S500, in the HRVG heat exchange process 500-502 or 5-36 to form a fully vaporized and superheated higher pressure leaner working solution stream S136 having the parameters as at the point 36, which corresponds to a state of superheated vapor. The heat source stream S500 can be a geothermal heat source stream, a flue gas heat source stream, any other hot heat source stream or a mixture or combination thereof.

In the process of vaporizing and superheating the heated higher pressure leaner working solution stream S105 in the HRVG, the stream S105 first attains parameters as at point 41, which correspond to a state of saturated liquid. Thereafter, stream S105 obtains parameters as at point 35, which corresponds to a state of superheated vapor. A temperature of the stream S105 having the parameters as at the point 35 is equal to a temperature of the richer working solution stream S134 having the parameters as at the point 34. Finally, the stream S105 is fully vaporized and superheated into the fully vaporized and superheated higher pressure leaner working solution stream S136 having the parameters as at the point 36 (as described above).

The fully vaporized and superheated higher pressure leaner working solution stream S136 now passes through an admission valve TV, where its pressure is reduced to form a pressure adjusted fully vaporized and superheated leaner working solution stream S137 having parameters as at a point 37, and then enters into a higher pressure turbine T1, where it is expanded and a portion of heat in the pressure adjusted fully vaporized and superheated leaner working solution stream S137 converted into electric power or another form of useable energy to form a spent leaner working solution stream S138 having parameters as at a point 38, which corresponds to a state of superheated vapor.

Thereafter, the spent leaner working solution stream S138 is divided into the first spent leaner working solution substream S139 having the parameters as at the point 39 and the second spent leaner working solution substream S131 having the parameters as at the point 31.

The first spent leaner working solution substream S139 is then combined with the basic rich solution stream S104 to form the richer working solution stream S134 (as described above) having the parameters as at the point 34.

Meanwhile, the second spent leaner working solution substream S131 is sent into the sixth heat exchange unit HE6, where it is first de-superheated to form a de-superheated leaner working solution substream S107 having parameters as at a point 7, which corresponds to a state of saturated vapor, and then partially condensed to form the partially condensed leaner substream S132 having the parameters as at the point 32. In the sixth heat exchange process 31-32 or 30-5, the second spent leaner working solution substream S131 provides heat to heat the leaner working solution stream S105 (as describe above).

The partially condensed leaner substream S132 is now combined with the heated higher pressure leaner working solution stream S110 to form the increased flow rate, higher pressure leaner working solution stream S133 having the parameters to at the point 33 (as described above).

As a result, the sixth heat exchange process 31-32 forms its own cycle, within the main cycle of the system, and provides for an increase in the flow rate of the leaner working solution which passes through the higher pressure turbine T1. Because no heat is rejected to the ambient in the process of such a circulation or internal cycle, the circulation provides higher efficiency for the system overall. This features is new and novel, which was not present in the prior art.

Looking back to the combined partially condensed condensing solution stream S121, it should be noted that a pressure of the stream S121 having the parameters as at the point 21, and correspondingly the pressure of the streams S122 and S123 having the parameters as at the points 22 and 23, respectively, is defined based upon a pressure of the stream S101 having the parameters as at the point 1, i.e., by the requirement to enable the complete condensation of the basic solution rich stream S127 in a first heat exchange unit HE1.

In prior applications, a temperature of the stream S121 having the parameters as at the point 21, which is equal to a temperature of the streams S122 and S123 having the parameters as at the points 22 and 23, was chosen in such a way that the composition of the saturated vapor S1 rich solution stream S122 having the parameters as at the point 22 has an equal or slightly higher amount of the lower boiling component than the composition of the basic rich solution. This, in turn, required that a temperature of the stream S103 having the parameters as at the point 3, i.e., the temperature at the beginning of the boiling of the rich basic solution, had to be lower than a temperature of the stream S121 having the parameters as at the point 21. Such a limitation on the temperature of the stream S103 having the parameters as at the point 3 also caused a limitation on a pressure of the stream S103. As a result, a pressure of the stream S117 having the parameters as at the point 17 (at the point of entrance into the second turbine T2) was also limited.

In the systems of the present invention, the pressure and temperature of the stream S103 having the parameters as at the point 3, and consequently the pressure and temperature of the stream S117 having the parameters as at the point 17 can be increased, and as a result, the composition of the vapor S1 rich solution stream S122 having the parameters as at the point 22 is leaner than the basic rich solution.

Meanwhile, the vapor S1 rich solution stream S122 is now divided into a first vapor S1 rich solution substream S126 having the parameters as at the points 26 and a second vapor S1 rich solution substream S148 having parameters as at a point 48.

The first vapor S1 rich solution substream S126 now enters into the second heat exchange unit HE2, where it is partially condensed, providing heat for process 2-3 or 26-40 (as described above) to form the cooled S1 rich solution substream S140 having parameters as at a point 40, which corresponds to a state of a vapor-liquid mixture.

The cooled S1 rich solution substream S140 now enters into a second gravity separator S2, where it is separated into a saturated vapor S2 rich solution stream S142 having parameters as at a point 42 and a saturated liquid S2 lean solution stream S143 having parameters as at a point 43. The saturated liquid S2 lean solution stream S143 is now divided into a first saturated liquid S2 lean solution substream S125 having parameters as at a point 25 and a second saturated liquid S2 lean solution substream S144 having parameters as at a point 44.

At the same time, the saturated vapor S2 rich solution stream S142 having the parameters as at the point 42, (which has a composition which is richer than the composition of the basic rich solution) is combined with the first saturated liquid S2 lean solution substream 5125 to form an intermediate composition stream 5145 having parameters as at a point 45.

Meanwhile, the second saturated liquid S2 lean solution substream S144 is sent into an upper port of a scrubber SCR, while the second vapor S1 rich solution substream S148 is sent into a lower port of the scrubber SCR.

In scrubber SCR, the vapor S1 rich solution substream S148 and the second saturated liquid S2 lean solution substream S144 directly interact in a distillation process. As a result of this distillation process, a vapor SCR rich solution stream S147 having parameters as at a point 47 is removed from a top port of the scrubber SCR. The vapor SCR rich solution stream S147 has a temperature which is only slightly higher than a temperature of the second saturated liquid S2 lean solution substream S144. The vapor SCR rich solution stream S147 has a composition which is substantially richer than the composition of the basic rich solution.

At the same time, a saturated liquid SCR lean solution stream S149 having parameters as at a point 49 is removed from a bottom port of the scrubber SCR. A temperature of the saturated liquid SCR lean solution stream S149 is slightly lower than a temperature of the vapor S1 rich solution substream S148. The composition of the saturated liquid SCR lean solution stream S149 having the parameters as at the point 49 is slightly leaner than a composition of the second S1 lean solution substream S124 having the parameters as at the point 24 (as described above). The saturated liquid SCR lean solution stream S149 is now mixed with the second S1 lean solution substream S124 to form the leaner working solution stream S146 (as described above).

Meanwhile, the vapor SCR rich solution stream S147 is now mixed with the intermediate composition stream S145 having the parameters as at the point 45 (as describe above) to form the basic rich solution stream S127 having the parameters as at the point 27.

The basic rich solution stream S127 now enters into the final condenser or first heat exchange unit HE1, where it is cooled in counterflow with a coolant stream S151 having parameters as at a point 51 in a first heat exchange precess 51-52 or 27-1 to form the fully condensed basis rich solution stream S101 having the parameters as at the point 1.

The cycle is closed.

As noted above, this system consists of three internal cycles. The first internal cycle comprises circulating of the spent leaner working solution substream S131 through sixth heat exchange unit HE6, the HRVG and the higher pressure turbine T1. The second internal cycle comprises circulating the leaner working solution stream S146 through the fourth heat exchange unit HE4, the sixth heat exchange unit HE6 and the HRVG, and then mixing the first spent leaner working solution substream S139 with the basic rich solution stream S104 to form the richer working solution stream S134 which passes through the HRVG and the lower pressure turbine T2. The third and main internal cycle comprises the basic rich solution stream S101 having the initial parameters as at the point 1, which passes through the second heat exchange unit HE2, the third heat exchange unit HE3, and fourth heat exchange unit HE5, and then after mixing as the stream S104 with the first leaner working solution substream S139 to form the richer working solution stream S134 passes through the HRVG and then through lower pressures turbine T2.

The first and second internal cycles reject their heat in such a way that it is fully recuperated by the third and main internal cycle, whereas heat rejected by the main internal cycle is reject into the ambient in the first heat exchange unit HE1 in counterflow with the coolant stream S151.

In the case that the coolant is water, an initial coolant stream S150 having initial parameters are as at a point 50 is pumped by a water pump or fourth pump P4, to an elevated pressure to form the coolant stream S151 having the parameters as at the point 51 before passing through the first heat exchange unit HE1 to form a spent coolant steam S152 having parameters as at a point 52.

In the case that the coolant is air, the coolant stream S151 having initial parameters of as at a point 51 is circulated by a fan installed at an exit of the coolant from HE1 (not shown.)

In the case that the initial heat source S500 for the present system is some sort of fuel, it can operate with a combustion system producing hot flue gas having the initial parameters as at the point 500.

It should be noted that the leaner working solution stream S105 and richer working solution stream S134 interacting with the heat source stream S500 in the HRVG are both is a state of a single phase, i.e., the stream S105 is a liquid, while the stream S134 is a vapor. As a result, it is easy to distribute these streams of working solutions among multiple pipes in the HRVG. This makes the present system suitable for application to the utilization of heat from solar collector system as well as flue gas, or geothermal heat sources.

TABLE 1

Solution, Streams and Points

| Name | Streams | Points |
| --- | --- | --- |
| basic rich solution | S127, S101, S102, S103, S108, & S104 | 27, 1, 2, 3, 8, & 4 |
| S1 lean solution | S123, S124, S128 & S129 | 23, 24, 28, & 29 |

TABLE 1-continued

Solution, Streams and Points

| Name | Streams | Points |
| --- | --- | --- |
| S2 lean solution | S143, S125, & S144 | 43, 25 & 44 |
| SCR lean solution | S149 | 49 |
| leaner working solution | S146, S109, S110, S133, S130, S105, S135, S136, S137, S138, S139, S131 & S132 | 46, 9, 10, 33, 30, 6, 5, 41, 35, 36, 37, 38, 39, 31, 7 & 32 |
| S1 rich solution | S122, S126, S140, & S148 | 22, 26, 40, & 48 |
| S2 rich solution | S142 | 42 |
| SCR rich solution | S147 | 47 |
| condensing solution | S120, S111, S112, S113, S114, & S121 | 20, 11, 12, 13, 14, & 21 |
| richer working solution | S134, S117, S118, & S119 | 34, 17, 18, & 19 |

CSQ-31s

Figure 2:
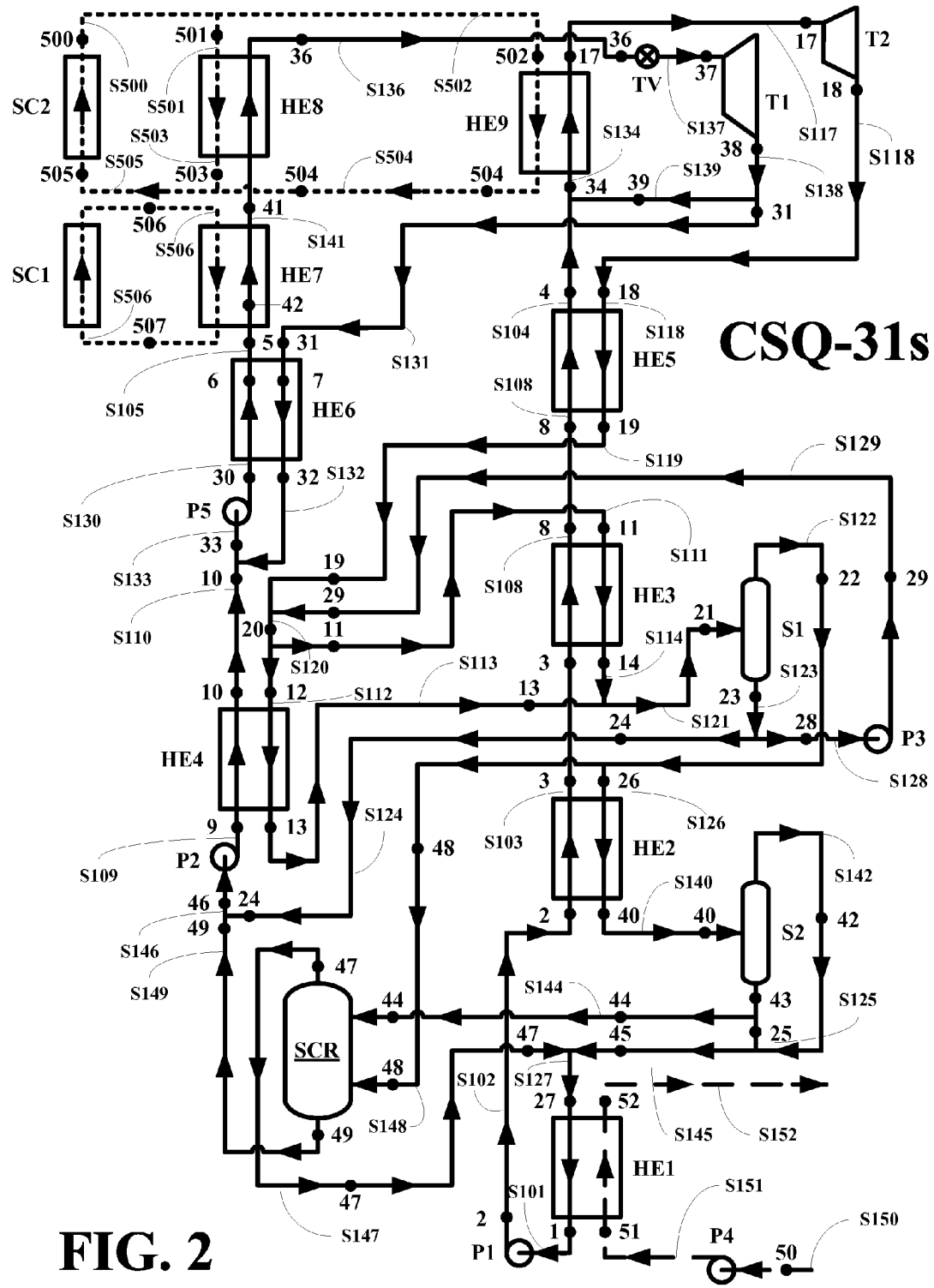
FIG. 2 depicts another embodiment of a system of this invention CSQ-31s.

Referring now the FIG. 2, a solar energy embodiment of this invention, generally CSQ-31s, is shown. In this embodiment, the HRVG is replaced by three heat exchanger units a seventh heat exchange unit HE7, an eighth heat exchange unit HE8 and a ninth heat exchange unit HE9 and two solar collectors SC1 and SC2.

The embodiment includes a fully condensed basic rich solution stream S101 having parameters as at a point 1. The stream S101 having the parameters as at the point 1 has a first composition of the multi-component fluid having a higher concentration of the lower boiling component and a concurrent lower concentration of the higher boiling component. The stream 101 is pumped through a feed pump P1 to form a higher pressure fully condensed basic rich solution stream S102 having parameters as at point 2, which corresponding to a state of subcooled liquid.

The higher pressure fully condensed basic rich solution stream S102 having the parameters as at the point 2 is then sent through a preheater or a second heat exchange unit HE2, where it is heated in counterflow with a vapor first S1 rich solution substream S126 having parameters as at a point 26 in a second heat exchange process 26-40 or 2-3 to form a preheated higher pressure basic rich solution stream S103 having parameters as at a point 3, which corresponds to a state of saturated liquid and a cooled, partially condensed first S1 rich substream S140 having parameters as at a point 40.

Thereafter, the preheated higher pressure basic rich solution stream S103 enters into a recuperative boiler-condenser or a third heat exchange unit HE3, where it is further heated and substantially vaporized (at least 80% vaporized) in counterflow with a first condensing solution substream S111 having parameters as at a point 11 in a third heat exchange process 11-14 or 3-8 to form a higher pressure substantially vaporized basic rich solution stream S108 having parameters as at a point 8 and a cooled first condensing solution substream S114 having parameters as at a point 14. The higher pressure substantially vaporized basic rich solution stream S108 corresponds to a state of a vapor-liquid mixture.

Thereafter, the higher pressure substantially vaporized basic rich solution stream S108 having the parameters as at the point 8 enters into a fifth heat exchange unit HE5, where it is further heated and fully vaporized and superheated, in counterflow with a spent richer working solution stream S118 having parameters as at a point 18 in a fifth heat exchange process 18-19 or 8-4 to form a higher pressure fully vaporized and superheated basic solution stream S104 having parameters as at a point 4 and a cooled spent richer working solution stream S119 having parameters as at a point 19.

Thereafter, the higher pressure fully vaporized and superheated basic rich solution stream S104 having the parameters as at the point 4 is combined with a first spent leaner working solution substream S139 having parameters as at a point 39 to form a richer working solution stream S134 having parameters as at a point 34, which corresponds to a state of superheated vapor. The spent leaner working solution S139 has a composition of the multi-component fluid, which is substantially leaner (i.e., contains a lower concentration of the lower boiling component) than the composition of the basic rich solution. A flow rate of the richer working solution stream S134 is substantially greater than a flow rate of the higher pressure fully vaporized and superheated basic rich solution stream S104 due to the addition of the first spent leaner working solution substream S139.

The richer working solution stream S134 now enters into a ninth heat exchange unit HE9, where it is heated in counter flow with a hot second SC2 heat transfer fluid substream S502 having parameters as at a point 502 in a ninth heat exchange process 34-17 or 502-504 to form a fully vaporized and superheated richer working solution stream S117 having parameters as at a point 17, which corresponds to a state of superheated vapor and a cooled second SC2 heat transfer fluid substream S504 having parameters as at a point 504.

The fully vaporized and superheated richer working solution stream S117 is then sent into a lower pressure turbine T2, where it is expanded and a portion of its heat is converted into power or other useable form of energy to form the spent richer working solution stream S118 having the parameters as at the point 18, still corresponding to a state of superheated vapor.

The spent richer working solution stream S118 now passes through the fifth heat exchange unit HE5 as described above, where it is cooled, providing heat for the fifth heat exchange process 8-4 or 18-19 to form the cooled spent richer working solution stream S119 having the parameters as at the point 19, which corresponds to a state of slightly superheated vapor.

The cooled spent richer working solution stream S119 is then combined with a higher pressure S1 lean solution substream S129 having parameters as at a point 29, which corresponds to a state of subcooled liquid (as described below) to form a condensing solution stream S120 having parameters as at a point 20, corresponding to a state of saturated vapor. The condensing solution stream S120 is then divided into the first condensing solution substream S111 having parameters as at a point 11 and a second condensing solution substream S112 having parameters as at a point 12.

The first condensing solution substream S111 now passes through the third heat exchange unit HE3, where it is partially condensed, providing heat for the third heat exchange process 3-8 or 11-14 (as described above) to form the cooled first condensing solution substream S114 having the parameters as at the point 14, which corresponds to a state of a vapor-liquid mixture, i.e., a bi-phase state.

The second condensing solution substream S112, meanwhile, passes through a preheater or fourth heat exchange unit HE4, where it is partially condensed, providing heat for a fourth heat exchange process 9-10 or 12-13 (as described below) to form a cooled second condensing solution substream S113 having parameters as at a point 13, which corresponds to a state to a state of a vapor-liquid mixture, i.e., a bi-phase state, just as with the first condensing solution substream S114.

Thereafter, the cooled condensing solution substreams S113 and S114 are combined to form a combined partially condensed condensing solution stream S121 having parameters as at a point 21. The combined partially condensed condensing solution stream S121 is then sent into a first gravity separator S1, where it is separated into a saturated vapor S1 rich solution stream S122 having parameters as at a point 22 and a S1 lean solution stream S123 having parameters as at a point 23, which corresponds to a state of saturated liquid.

The S1 lean solution stream S123 is then divided into a first S1 lean solution substream S128 having parameters as at a points 28 and a second S1 lean solution substream S124 having parameters as at a point 24.

The first S1 lean solution substream S128 is then sent into a circulating pump or third pump P3, where its pressures is increased to a pressure equal to or substantially equal to a pressure of the cooled spent richer working solution stream S119 having the parameters as at the point 19, to form a higher pressure first S1 lean solution substream S129 having the parameters as at the point 29. The higher pressure first S1 lean solution substream S129 is now mixed with the cooled spent richer working solution stream S119 to form the condensing solution stream S120 having the parameters as at the point 20 (as described above.)

Meanwhile, the second S1 lean solution substream S124 is now mixed with a SCR lean solution stream S149 (as described below) to form a leaner working solution stream S146 having parameters as at a point 46. The leaner working solution stream S146 is now pumped by a booster pump or second pump P2, to an elevated pressure, to form a higher pressure leaner working solution stream S109 having parameters as at a point 9, which corresponds to a state of subcooled liquid.

The higher pressure leaner working solution stream S109 then enters into the fourth heat exchange unit HE4, where it is heated in counterflow with the second condensing solution substream S112 in the fourth heat exchange process 12-13 or 9-10 (as described above) to form a heated leaner working solution stream S110 having parameters as at a point 10. A pressure of the heated leaner working solution stream S110 having the parameters as at the point 10 is somewhat lower than a pressure of the higher pressure fully vaporized and superheated basic solution stream S104 having the parameters as at the points 4 and a spent leaner working solution stream S138 having parameters as at a point 38.

Thereafter, the heated leaner working solution stream S110 is mixed with a cooled second spent leaner working solution substream S132 having parameters as at a point 32 (as described below) to form an increased flow rate, leaner working solution stream S133 having parameters as at a point 33.

At this point, the cooled second spent leaner working solution substream S132 is in a state of a bi-phase liquid-vapor mixture, whereas the heated leaner working solution stream S110 is a state of subcooled liquid. As a result of mixing the streams S110 and S132, the stream S110 fully absorbs the stream S132, forming the increased flow rate, leaner working solution stream S133 having the parameters as the point 33, which corresponds to a state of saturated or slightly subcooled liquid.

Thereafter, the increased flow rate, leaner working solution stream S133 is pumped by a high pressure pump or five pump P5 to a desired higher pressure to form a higher pressure leaner working solution stream S130 having parameters as at a point 30, which corresponds to a state of subcooled liquid.

The higher pressure leaner working solution stream S130 now enters into a sixth heat exchange unit HE6, where it is heated in counterflow with a second spent leaner working solution substream S131 having parameters as at a point 31 in a sixth heat exchange process 31-32 or 31-7 and 7-32 or 30-5 or 30-6 and 6-5 (as described below) to form a heated higher pressure leaner working solution stream S105 having parameters as at a point 5, which still corresponds to a state subcooled liquid.

Thereafter, the heated higher pressure leaner working solution stream S105 is sent into a seventh heat exchange unit HE7, where it is heated, fully vaporized and superheated, in counterflow with a hot SC1 heat transfer fluid stream S506, in a seventh heat exchange process 5-41 or 506-507 to form a fully vaporized higher pressure leaner working solution stream S141 having the parameters as at the point 41, which corresponds to a state of saturated vapor.

In the process of vaporizing the heated higher pressure leaner working solution stream S105 in the seventh heat exchange unit HE7, the stream S105 first attains parameters as at point 42, which correspond to a state of saturated liquid and then is fully vaporized into the fully vaporized higher pressure leaner working solution stream S141 having the parameters as at the point 41 (as described above). The hot SC1 heat transfer fluid stream S506 is derived from a cold SC1 heat transfer fluid stream S507 using solar energy from a first a solar collector SC1.

Thereafter, the fully vaporized higher pressure leaner working solution stream S141 passes through an eighth heat exchange unit HE8, where it is superheated in counter flow with a first hot SC2 heat transfer fluid substream S501 having parameters as at a point 501 in an eighth heat exchange process 41-36 or 501-503 to form a fully vaporized and superheated higher pressure leaner working solution stream S136 having parameters as at a point 36. The first hot SC2 heat transfer fluid substream S501 is derived from a hot SC2 heat transfer fluid stream S500 having parameters as at a point 500, which is formed from heating a cold SC2 heat transfer fluid stream S505 having parameters at as a point 505 using heat from a solar collector SC2. The hot SC2 heat transfer fluid stream S500 is then divided into the first hot SC2 heat transfer fluid substream S501 and the second hot SC2 heat transfer fluid substream S502. The hot SC2 heat transfer fluid substreams S501 and S502 are using to superheated the fully vaporized leaner working fluid stream S141 and the fully vaporized richer working fluid steam S134.

The fully vaporized and superheated higher pressure leaner working solution stream S138 now passes through an admission valve TV, where its pressure is reduced to form a pressure adjusted fully vaporized and superheated leaner working solution stream S137 having parameters as at a point 37, and then enters into a higher pressure turbine T1, where it is expanded and a portion of heat in the pressure adjusted fully vaporized and superheated leaner working solution stream S137 converted into electric power or another form of useable energy to form a spent leaner working solution stream S138 having parameters as at a point 38, which corresponds to a state of superheated vapor.

Thereafter, the spent leaner working solution stream S138 is divided into the first spent leaner working solution substream S139 having the parameters as at the point 39 and the second spent leaner working solution substream S131 having the parameters as at the point 31.

The first spent leaner working solution substream S139 is then combined with the basic rich solution stream S104 to form the richer working solution stream S134 (as described above) having the parameters as at the point 34.

Meanwhile, the second spent leaner working solution substream S131 is sent into the sixth heat exchange unit HE6, where it is first de-superheated to form a de-superheated leaner working solution substream S107 having parameters as at a point 7, which corresponds to a state of saturated vapor, and then partially condensed to form the partially condensed leaner substream S132 having the parameters as at the point 32. In the sixth heat exchange process 31-32 or 30-5, the second spent leaner working solution substream S131 provides heat to heat the leaner working solution stream S105 (as describe above).

The partially condensed leaner substream stream S132 is now combined with the heated higher pressure leaner working solution stream S110 to form the increased flow rate, higher pressure leaner working solution stream S133 having the parameters to at the point 33 (as described above).

As a result, the sixth heat exchange process 31-32 forms its own cycle, within the main cycle of the system, and provides for an increase in the flow rate of the leaner working solution which passes through the higher pressure turbine T1. Because no heat is rejected to the ambient in the process of such a circulation or internal cycle, the circulation provides higher efficiency for the system overall. This features is new and novel, which was not present in the prior art.

Looking back to the combined partially condensed condensing solution stream S121, it should be noted that a pressure of the stream S121 having the parameters as at the point 21, and correspondingly the pressure of the streams S122 and S123 having the parameters as at the points 22 and 23, respectively, is defined based upon a pressure of the stream S101 having the parameters as at the point 1, i.e., by the requirement to enable the complete condensation of the basic solution rich stream S127 in a first heat exchange unit HE1.

In prior applications, a temperature of the stream S121 having the parameters as at the point 21, which is equal to a temperature of the streams S122 and S123 having the parameters as at the points 22 and 23, was chosen in such a way that the composition of the saturated vapor S1 rich solution stream S122 having the parameters as at the point 22 has an equal or slightly higher amount of the lower boiling component than the composition of the basic rich solution. This, in turn, required that a temperature of the stream S103 having the parameters as at the point 3, i.e., the temperature at the beginning of the boiling of the rich basic solution, had to be lower than a temperature of the stream S121 having the parameters as at the point 21. Such a limitation on the temperature of the stream S103 having the parameters as at the point 3 also caused a limitation on a pressure of the stream S103. As a result, a pressure of the stream S117 having the parameters as at the point 17 (at the point of entrance into the second turbine T2) was also limited.

In the systems of the present invention, the pressure and temperature of the stream S103 having the parameters as at the point 3, and consequently the pressure and temperature of the stream S117 having the parameters as at the point 17 can be increased, and as a result, the composition of the vapor S1 rich solution stream S122 having the parameters as at the point 22 is leaner than the basic rich solution.

Meanwhile, the vapor S1 rich solution stream S122 is now divided into a first vapor S1 rich solution substream S126 having the parameters as at the points 26 and a second vapor S1 rich solution substream S148 having parameters as at a point 48.

The first vapor S1 rich solution substream S126 now enters into the second heat exchange unit HE2, where it is partially condensed, providing heat for process 2-3 or 26-40 (as described above) to form the cooled S1 rich solution substream S140 having parameters as at a point 40, which corresponds to a state of a vapor-liquid mixture.

The cooled S1 rich solution substream S140 now enters into a second gravity separator S2, where it is separated into a saturated vapor S2 rich solution stream S142 having parameters as at a point 42 and a saturated liquid S2 lean solution stream S143 having parameters as at a point 43. The saturated liquid S2 lean solution stream S143 is now divided into a first saturated liquid S2 lean solution substream S125 having parameters as at a point 25 and a second saturated liquid S2 lean solution substream S144 having parameters as at a point 44.

At the same time, the saturated vapor S2 rich solution stream S142 having the parameters as at the point 42, (which has a composition which is richer than the composition of the basic rich solution) is combined with the first saturated liquid S2 lean solution substream S125 to form an intermediate composition stream S145 having parameters as at a point 45.

Meanwhile, the second saturated liquid S2 lean solution substream S144 is sent into an upper port of a scrubber SCR, while the second vapor S1 rich solution substream S148 is sent into a lower port of the scrubber SCR.

In scrubber SCR, the vapor S1 rich solution substream S148 and the second saturated liquid S2 lean solution substream S144 directly interact in a distillation process. As a result of this distillation process, a vapor SCR rich solution stream S147 having parameters as at a point 47 is removed from a top port of the scrubber SCR. The vapor SCR rich solution stream S147 has a temperature which is only slightly higher than a temperature of the second saturated liquid S2 lean solution substream S144. The vapor SCR rich solution stream S147 has a composition which is substantially richer than the composition of the basic rich solution.

At the same time, a saturated liquid SCR lean solution stream S149 having parameters as at a point 49 is removed from a bottom port of the scrubber SCR. A temperature of the saturated liquid SCR lean solution stream S149 is slightly lower than a temperature of the vapor S1 rich solution substream S148. The composition of the saturated liquid SCR lean solution stream S149 having the parameters as at the point 49 is slightly leaner than a composition of the second S1 lean solution substream S124 having the parameters as at the point 24 (as described above). The saturated liquid SCR lean solution stream S149 is now mixed with the second S1 lean solution substream S124 to form the leaner working solution stream S146 (as described above).

Meanwhile, the vapor SCR rich solution stream S147 is now mixed with the intermediate composition stream S145 having the parameters as at the point 45 (as describe above) to form the basic rich solution stream S127 having the parameters as at the point 27.

The basic rich solution stream S127 now enters into the final condenser or first heat exchange unit HE1, where it is cooled in counterflow with a coolant stream S151 having parameters as at a point 51 in a first heat exchange precess 51-52 or 27-1 to form the fully condensed basis rich solution stream S101 having the parameters as at the point 1.

The cycle is closed.

As noted above, this system consists of three internal cycles. The first internal cycle comprises circulating of the spent leaner working solution substream S131 through the sixth heat exchange unit HE6, the seventh heat exchange unit HE7 and the eighth heat exchange unit HE8 and the higher pressure turbine T1. The second internal cycle comprises circulating the leaner working solution stream S146 through the fourth heat exchange unit HE4, the sixth heat exchange unit HE6, and the seventh heat exchange unit HE7 and the eighth heat exchange unit HE8, and then mixing the first spent leaner working solution substream S139 with the basic rich solution stream S104 to form the richer working solution stream S134 which passes through the ninth heat exchange unit HE9 and the lower pressure turbine T2. The third and main internal cycle comprises the basic rich solution stream S101 having the initial parameters as at the point 1, which passes through the second heat exchange unit HE2, the third heat exchange unit HE3, and fourth heat exchange unit HE5, and then after mixing as the stream S104 with the first leaner working solution substream S139 to form the richer working solution stream S134 passes through the ninth heat exchange unit HE9 and then through lower pressures turbine T2.

The first and second internal cycles reject their heat in such a way that it is fully recuperated by the third and main internal cycle, whereas heat rejected by the main internal cycle is reject into the ambient in the first heat exchange unit HE1 in counterflow with the coolant stream S151.

In the case that the coolant is water, an initial coolant stream S150 having initial parameters are as at a point 50 is pumped by a water pump or fourth pump P4, to an elevated pressure to form the coolant stream S151 having the parameters as at the point 51 before passing through the first heat exchange unit HE1 to form a spent coolant steam S152 having parameters as at a point 52.

In the case that the coolant is air, the coolant stream S151 having initial parameters of as at a point 51 is circulated by a fan installed at an exit of the coolant from HE1 (not shown.)

In the case that the initial heat source S500 for the present system is some sort of fuel, it can operate with a combustion system producing hot flue gas having the initial parameters as at the point 500.

It should be noted that the leaner working solution stream S105 and richer working solution stream S134 interacting with the hot heat transfer fluids from two solar collector units utilized in the seventh heat exchange unit HE7, the eighth heat exchange unit HE8 and the ninth heat exchange unit HE9 reduces a mean temperature of the heat source for the present system. The reduction of the mean temperature of the heat source, in turn, reduces the radiated losses of heat in the solar collectors and increases the efficiency of the solar collector units. It is understood that streams S105, S141 and S134, which are all in a state of a single phase improving heating efficiencies in the seventh heat exchange unit HE7, the eighth heat exchange unit HE8 and the ninth heat exchange unit HE9.

TABLE 2

Solution, Streams and Points

| Name | Streams | Points |
| --- | --- | --- |
| basic rich solution | S127, S101, S102, S103, S108, & S104 | 27, 1, 2, 3, 8, & 4 |
| S1 lean solution | S123, S124, S128 & S129 | 23, 24, 28, & 29 |
| S2 lean solution | S143, S125, & S144 | 43, 25 & 44 |
| SCR lean solution | S149 | 49 |
| leaner working solution | S146, S109, S110 S133, S130, S106, S105, S141, S136, S137, S138, S139, S131 & S132 | 46, 9, 10, 33, 30, 6, 5, 42, 41, 36, 37, 38, 39, 31, 7 & 32 |
| S1 rich solution | S122, S126, S140, & S148 | 22, 26, 40, & 48 |
| S2 rich solution | S142 | 42 |
| SCR rich solution | S147 | 47 |
| condensing solution | S120, S111, S112, S113, S114, & S121 | 20, 11, 12, 13, 14, & 21 |
| richer working solution | S134, S117, S118, & S119 | 34, 17, 18, & 19 |

CSQ-31s-d

Figure 3:
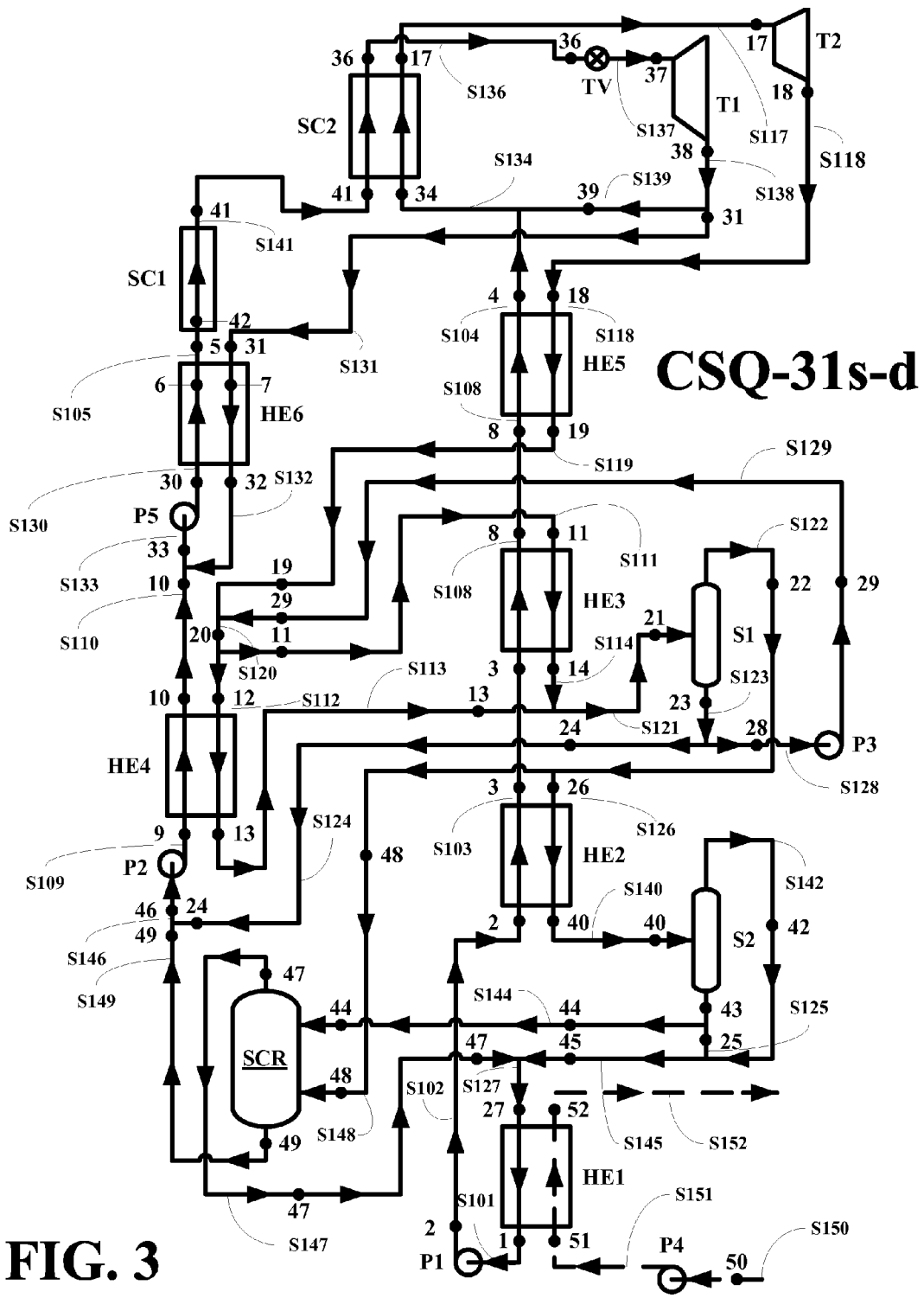
FIG. 3 depicts another embodiment of a system of this invention CSQ-31s-d.

Referring to FIG. 3, a direct solar heating variant, generally CSQ-31s-d, is shown. It is understood that streams S105, S141 and S134, which are all in a state of a single phase, can be sent directly into solar collectors, without using a heat transfer fluid (HTF). This arrangement, called direct vapor generation, eliminates the need for the seventh heat exchange unit HE7, the eighth heat exchange unit HE8 and the ninth heat exchange unit HE9. However, this arrangement increases the pressure losses of the working fluid passing though the solar collectors. The system CSQ-31s-d is identical to the system CSQ-31s as described above, except that the stream S105 passes directly through the first solar collector unit SC1 and the streams S141 and S134 pass directly through the second solar collector unit SC2.

TABLE 3

Solution, Streams and Points

| Name | Streams | Points |
| --- | --- | --- |
| basic rich solution | S127, S101, S102, S103, S108, & S104 | 27, 1, 2, 3, 8, & 4 |
| S1 lean solution | S123, S124, S128 & S129 | 23, 24, 28, & 29 |
| S2 lean solution | S143, S125, & S144 | 43, 25 & 44 |
| SCR lean solution | S149 | 49 |
| leaner working solution | S146, S109, S110 S133, S130, S106, S105, S141, S136, S137, S138, S139, S131 & S132 | 46, 9, 10, 33, 30, 6, 5, 42, 41, 36, 37, 38, 39, 31, 7 & 32 |
| S1 rich solution | S122, S126, S140, & S148 | 22, 26, 40, & 48 |
| S2 rich solution | S142 | 42 |
| SCR rich solution | S147 | 47 |

TABLE 3-continued

Solution, Streams and Points

| Name | Streams | Points |
| --- | --- | --- |
| condensing solution | S120, S111, S112, S113, S114, & S121 | 20, 11, 12, 13, 14, & 21 |
| richer working solution | S134, S117, S118, & S119 | 34, 17, 18, & 19 |

CSQ-21h

Figure 4:
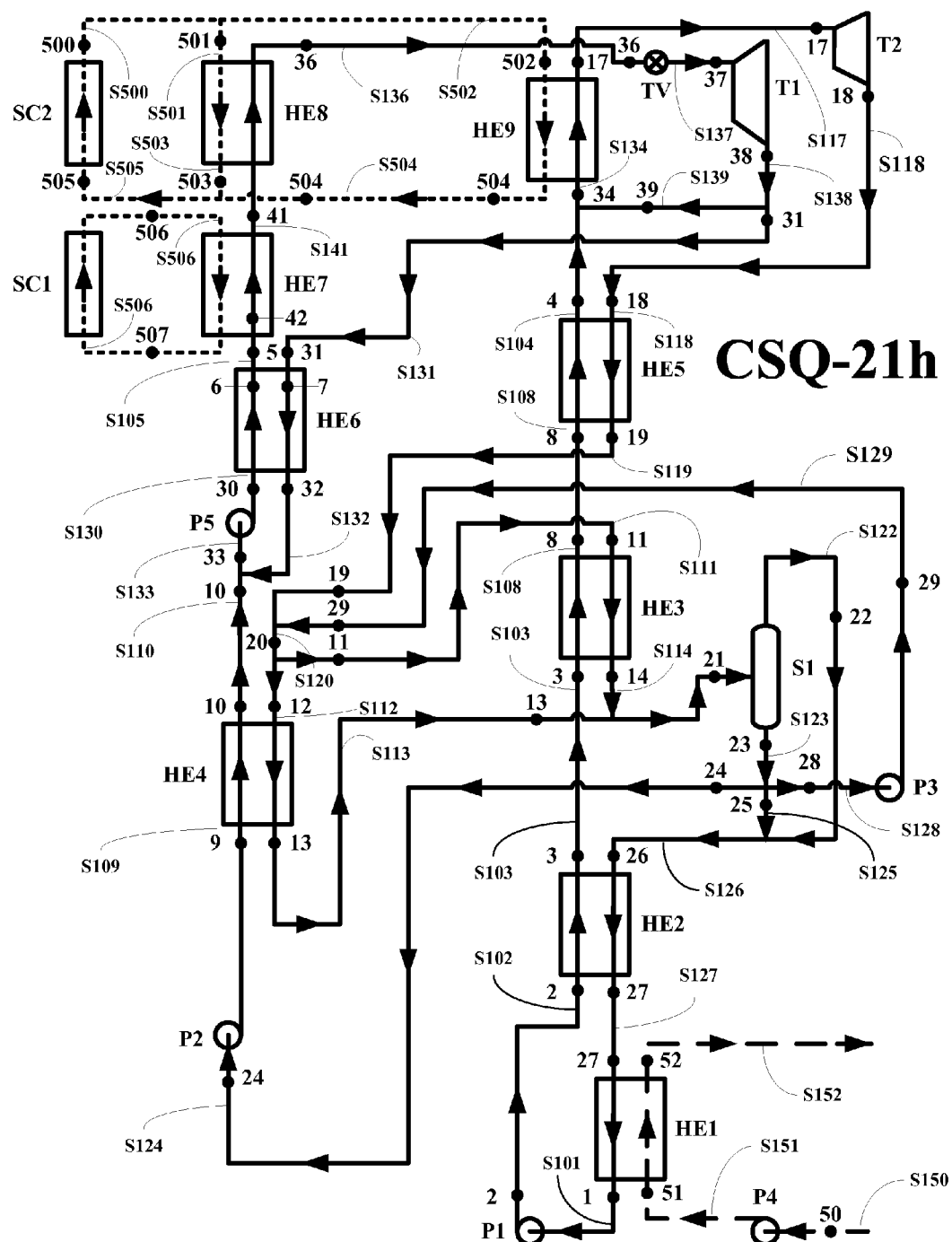
FIG. 4 depicts another embodiment of a system of this invention CSQ-21h.

Referring now the FIG. 4, a solar energy embodiment of this invention, generally CSQ-21h, is shown. A fully condensed basic rich solution stream S101 having parameters as at a point 1. The stream S101 having the parameters as at the point 1 has a first composition of the multi-component fluid having a higher concentration of the lower boiling component and a concurrent lower concentration of the higher boiling component. The stream 101 is pumped through a feed pump P1 to form a higher pressure fully condensed basic rich solution stream S102 having parameters as at point 2, which corresponds to a state of subcooled liquid.

The higher pressure fully condensed basic rich solution stream S102 having the parameters as at the point 2 is then sent through a preheater or a second heat exchange unit HE2, where it is heated in counterflow with a returning basis rich solution stream S126 having parameters as at a point 26 in a second heat exchange process 26-27 or 2-3 to form a preheated higher pressure basic rich solution stream S103 having parameters as at a point 3, which corresponds to a state of saturated liquid and a cooled, partially condensed returning basic rich solution stream S127 having parameters as at a point 27.

Thereafter, the preheated higher pressure basic rich solution stream S103 enters into a recuperative boiler-condenser or a third heat exchange unit HE3, where it is further heated and substantially vaporized (at least 80% vaporized) in counterflow with a first condensing solution substream S111 having parameters as at a point 11 in a third heat exchange process 11-14 or 3-8 to form a higher pressure substantially vaporized basic rich solution stream S108 having parameters as at a point 8 and a cooled first condensing solution substream S114 having parameters as at a point 14. The higher pressure substantially vaporized basic rich solution stream S108 corresponds to a state of a vapor-liquid mixture.

Thereafter, the higher pressure substantially vaporized basic rich solution stream S108 having the parameters as at the point 8 enters into a fifth heat exchange unit HE5, where it is further heated and fully vaporized and superheated, in counterflow with a spent richer working solution stream S118 having parameters as at a point 18 in a fifth heat exchange process 18-19 or 8-4 to form a higher pressure fully vaporized and superheated basic solution stream S104 having parameters as at a point 4 and a cooled spent richer working solution stream S119 having parameters as at a point 19.

Thereafter, the higher pressure fully vaporized and superheated basic rich solution stream S104 having the parameters as at the point 4 is combined with a first spent leaner working solution substream S139 having parameters as at a point 39 to form a richer working solution stream S134 having parameters as at a point 34, which corresponds to a state of superheated vapor. The spent leaner working solution S139 has a composition of the multi-component fluid, which is substantially leaner (i.e., contains a lower concentration of the lower boiling component) than the composition of the basic rich solution. A flow rate of the richer working solution stream S134 is substantially greater than a flow rate of the higher pressure fully vaporized and superheated basic rich solution stream S104 due to the addition of the first spent leaner working solution substream S139.

The richer working solution stream S134 now enters into a ninth heat exchange unit HE9, where it is heated in counter flow with a hot second SC2 heat transfer fluid substream S502 having parameters as at a point 502 in a ninth heat exchange process 34-17 or 502-504 to form a fully vaporized and superheated richer working solution stream S117 having parameters as at a point 17, which corresponds to a state of superheated vapor and a cooled second SC2 heat transfer fluid substream S504 having parameters as at a point 504.

The fully vaporized and superheated richer working solution stream S117 is then sent into a lower pressure turbine T2, where it is expanded and a portion of its heat is converted into power or other useable form of energy to form the spent richer working solution stream S118 having the parameters as at the point 18, still corresponding to a state of superheated vapor.

The spent richer working solution stream S118 now passes through the fifth heat exchange unit HE5 as described above, where it is cooled, providing heat for the fifth heat exchange process 8-4 or 18-19 to form the cooled spent richer working solution stream S119 having the parameters as at the point 19, which corresponds to a state of slightly superheated vapor.

The cooled spent richer working solution stream S119 is then combined with a higher pressure S1 lean solution substream S129 having parameters as at a point 29, which corresponds to a state of subcooled liquid (as described below) to form a condensing solution stream S120 having parameters as at a point 20, corresponding to a state of saturated vapor. The condensing solution stream S120 is then divided into the first condensing solution substream S111 having parameters as at a point 11 and a second condensing solution substream S112 having parameters as at a point 12.

The first condensing solution substream S111 now passes through the third heat exchange unit HE3, where it is partially condensed, providing heat for the third heat exchange process 3-8 or 11-14 (as described above) to form the cooled first condensing solution substream S114 having the parameters as at the point 14, which corresponds to a state of a vapor-liquid mixture, i.e., a bi-phase state.

The second condensing solution substream S112, meanwhile, passes through a preheater or fourth heat exchange unit HE4, where it is partially condensed, providing heat for a fourth heat exchange process 9-10 or 12-13 (as described below) to form a cooled second condensing solution substream S113 having parameters as at a point 13, which corresponds to a state to a state of a vapor-liquid mixture, i.e., a bi-phase state, just as with the first condensing solution substream S114.

Thereafter, the cooled condensing solution substreams S113 and S114 are combined to form a combined partially condensed condensing solution stream S121 having parameters as at a point 21. The combined partially condensed condensing solution stream S121 is then sent into a first gravity separator S1, where it is separated into a saturated vapor S1 rich solution stream S122 having parameters as at a point 22 and a S1 lean solution stream S123 having parameters as at a point 23, which corresponds to a state of saturated liquid.

The S1 lean solution stream S123 is then divided into a first S1 lean solution substream S128 having parameters as at a points 28, a second S1 lean solution substream S124 having parameters as at a point 24 and a third S1 lean solution substream S125 having parameters as at a point 25.

The first S1 lean solution substream S128 is then sent into a circulating pump or third pump P3, where its pressures is increased to a pressure equal to or substantially equal to a pressure of the cooled spent richer working solution stream S119 having the parameters as at the point 19, to form a higher pressure first S1 lean solution substream S129 having the parameters as at the point 29. The higher pressure first S1 lean solution substream S129 is now mixed with the cooled spent richer working solution stream S119 to form the condensing solution stream S120 having the parameters as at the point 20 (as described above.)

Meanwhile, the second S1 lean solution substream S124 is pumped by a booster pump or second pump P2, to an elevated pressure, to form a leaner working solution stream S109 having parameters as at a point 9, which corresponds to a state of subcooled liquid.

The leaner working solution stream S109 then enters into the fourth heat exchange unit HE4, where it is heated in counterflow with the second condensing solution substream S112 in the fourth heat exchange process 12-13 or 9-10 (as described above) to form a heated leaner working solution stream S110 having parameters as at a point 10. A pressure of the heated leaner working solution stream S110 having the parameters as at the point 10 is somewhat lower than a pressure of the higher pressure fully vaporized and superheated basic solution stream S104 having the parameters as at the points 4 and a spent leaner working solution stream S138 having parameters as at a point 38.

Thereafter, the heated higher pressure leaner working solution stream S110 is mixed with a cooled second spent leaner working solution substream S132 having parameters as at a point 32 (as described below) to form an increased flow rate, leaner working solution stream S133 having parameters as at a point 33.

At this point, the cooled second spent leaner working solution substream S132 is in a state of a bi-phase liquid-vapor mixture, whereas the heated higher pressure leaner working solution stream S110 is a state of subcooled liquid. As a result of mixing the streams S110 and S132, the stream S110 fully absorbs the stream S132, forming the increased flow rate, leaner working solution stream S133 having the parameters as the point 33, which corresponds to a state of saturated or slightly subcooled liquid.

Thereafter, the increased flow rate, leaner working solution stream S133 is pumped by a high pressure pump or five pump P5 to a desired higher pressure to form a higher pressure leaner working solution stream S130 having parameters as at a point 30, which corresponds to a state of subcooled liquid.

The higher pressure leaner working solution stream S130 now enters into a sixth heat exchange unit HE6, where it is heated in counterflow with a second spent leaner working solution substream S131 having parameters as at a point 31 in a sixth heat exchange process 31-32 or 30-5 (as described below) to form a heated higher pressure leaner working solution stream S105 having parameters as at a point 5, which still corresponds to a state subcooled liquid.

Thereafter, the heated higher pressure leaner working solution stream S105 is sent into a seventh heat exchange unit HE7, where it is heated, fully vaporized and superheated, in counterflow with a hot SC1 heat transfer fluid stream S506, in a seventh heat exchange process 5-41 or 506-507 to form a fully vaporized higher pressure leaner working solution stream S141 having the parameters as at the point 41, which corresponds to a state of saturated vapor.

Thereafter, the fully vaporized higher pressure leaner working solution stream S141 passes through an eighth heat exchange unit HE8, where it is superheated in counter flow with a first hot SC2 heat transfer fluid substream S501 having parameters as at a point 501 in an eighth heat exchange process 41-36 or 501-503 to form a fully vaporized and superheated higher pressure leaner working solution stream S136 having parameters as at a point 36. The first hot SC2 heat transfer fluid substream S501 is derived from a hot SC2 heat transfer fluid stream S500 having parameters as at a point 500, which is formed from heating a cold SC2 heat transfer fluid stream S505 having parameters at as a point 505 using heat from a solar collector SC2. The hot SC2 heat transfer fluid stream S500 is then divided into the first hot SC2 heat transfer fluid substream S501 and the second hot SC2 heat transfer fluid substream S502. The hot SC2 heat transfer fluid substreams S501 and S502 are using to superheated the fully vaporized leaner working fluid stream S141 and the fully vaporized richer working fluid steam S134.

The fully vaporized and superheated higher pressure leaner working solution stream S136 now passes through an admission valve TV, where its pressure is reduced to form a pressure adjusted fully vaporized and superheated leaner working solution stream S137 having parameters as at a point 37, and then enters into a higher pressure turbine T1, where it is expanded and a portion of heat in the pressure adjusted fully vaporized and superheated leaner working solution stream S137 converted into electric power or another form of useable energy to form a spent leaner working solution stream S138 having parameters as at a point 38, which corresponds to a state of superheated vapor.

Thereafter, the spent leaner working solution stream S138 is divided into the first spent leaner working solution substream S139 having the parameters as at the point 39 and the second spent leaner working solution substream S131 having the parameters as at the point 31.

The first spent leaner working solution substream S139 is then combined with the basic rich solution stream S104 to form the richer working solution stream S134 (as described above) having the parameters as at the point 34.

Meanwhile, the second spent leaner working solution substream S131 is sent into the sixth heat exchange unit HE6 to supply heat for the sixth heat exchange process 31-32 or 30-5, the second spent leaner working solution substream S131 provides heat to heat the leaner working solution stream S105 (as describe above).

The partially condensed leaner substream stream S132 is now combined with the heated higher pressure leaner working solution stream S110 to form the increased flow rate, higher pressure leaner working solution stream S133 having the parameters to at the point 33 (as described above).

As a result, the sixth heat exchange process 31-32 forms its own cycle, within the main cycle of the system, and provides for an increase in the flow rate of the leaner working solution which passes through the higher pressure turbine T1. Because no heat is rejected to the ambient in the process of such a circulation or internal cycle, the circulation provides higher efficiency for the system overall. This features is new and novel, which was not present in the prior art.

Looking back to the combined partially condensed condensing solution stream S121, it should be noted that a pressure of the stream S121 having the parameters as at the point 21, and correspondingly the pressure of the streams S122 and S123 having the parameters as at the points 22 and 23, respectively, is defined based upon a pressure of the stream S101 having the parameters as at the point 1, i.e., by the requirement to enable the complete condensation of the basic solution rich stream S127 in a first heat exchange unit HE1.

solution stream S101 having the initial parameters as at the point 1, which passes through the second heat exchange unit HE2, the third heat exchange unit HE3, and fourth heat exchange unit HE5, and then after mixing as the stream S104 with the first leaner working solution substream S139 to form the richer working solution stream S134 passes through the SC2 and then through lower pressures turbine T2.

TABLE 4

Solution, Streams and Points

| Name | Streams | Points |
| --- | --- | --- |
| basic rich solution | S126, S127, S101, S102, S103, S108, & S104 | 26, 27, 1, 2, 3, 8, & 4 |
| lean working solution | S123, S124, S128, S129, S109, S110, S133, S130, S106, S105, S142, S141, S136, S137, S138, S139, S131, S107, & S132 | 23, 24, 28, 29, 9, 10, 33, 30, 6, 5, 41, 35, 36, 37, 38, 39, 31, 7, & 32 |
| S1 rich solution | S122 | 22 |
| condensing solution | S120, S111, S112, S113, S114, & S121 | 20, 11, 12, 13, 14, & 21 |
| rich working solution | S134, S117, S118, & S119 | 34, 17, 18, & 19 |

In prior applications, a temperature of the stream S121 having the parameters as at the point 21, which is equal to a temperature of the streams S122 and S123 having the parameters as at the points 22 and 23, was chosen in such a way that the composition of the saturated vapor S1 rich solution stream S122 having the parameters as at the point 22 has an equal or slightly higher amount of the lower boiling component than the composition of the basic rich solution. This, in turn, required that a temperature of the stream S103 having the parameters as at the point 3, i.e., the temperature at the beginning of the boiling of the rich basic solution, had to be lower than a temperature of the stream S121 having the parameters as at the point 21. Such a limitation on the temperature of the stream S103 having the parameters as at the point 3 also caused a limitation on a pressure of the stream S103. As a result, a pressure of the stream S117 having the parameters as at the point 17 (at the point of entrance into the second turbine T2) was also limited.

In the systems of the present invention, the pressure and temperature of the stream S103 having the parameters as at the point 3, and consequently the pressure and temperature of the stream S117 having the parameters as at the point 17 can be increased, and as a result, the composition of the vapor S1 rich solution stream S122 having the parameters as at the point 22 is leaner than the basic rich solution.

The basic rich solution stream S127 now enters into the final condenser or first heat exchange unit HE1, where it is cooled in counterflow with a coolant stream S151 having parameters as at a point 51 in a first heat exchange precess 51-52 or 27-1 to form the fully condensed basis rich solution stream S101 having the parameters as at the point 1.

The cycle is closed.

As noted above, this system consists of three internal cycles. The first internal cycle comprises circulating of the spent leaner working solution substream S131 through sixth heat exchange unit HE6, the HRVG and the higher pressure turbine T1. The second internal cycle comprises circulating the leaner working solution stream S109 through the fourth heat exchange unit HE4, the sixth heat exchange unit HE6 and the SC1 and SC2, and then mixing the first spent leaner working solution substream S139 with the basic rich solution stream S104 to form the richer working solution stream S134 which passes through the SC2 and the lower pressure turbine T2. The third and main internal cycle comprises the basic rich The first and second internal cycles reject their heat in such a way that it is fully recuperated by the third and main internal cycle, whereas heat rejected by the main internal cycle is reject into the ambient in the first heat exchange unit HE1 in counterflow with the coolant stream S151.

In the case that the coolant is water, an initial coolant stream S150 having initial parameters are as at a point 50 is pumped by a water pump or fourth pump P4, to an elevated pressure to form the coolant stream S151 having the parameters as at the point 51 before passing through the first heat exchange unit HE1 to form a spent coolant steam S152 having parameters as at a point 52.

In the case that the coolant is air, the coolant stream S151 having initial parameters of as at a point 51 is circulated by a fan installed at an exit of the coolant from HE1 (not shown.)

In a simplified variant of the present system, it is possible to reduce an inlet pressure into the low pressure turbine T2, (stream S117 having the parameters as at the point 17) so that a temperatures at of the basic rich solution stream S103 having the parameters as at the point 3 and the combined condensing solution stream S121 having the parameters as at the point 21 will be lowered, and the composition of vapor rich solution stream S122 having the parameters as at the point 22 will become equal or richer than the composition of the basic rich solution. In this case, the scrubber SCR, and the separator S2 can be removed from the system. Such an arrangement will simplify the system, but will reduce its efficiency somewhat. This arrangement is shown in FIG. 4, (described above and designation as CSQ-21h). The embodiment CSQ-12h includes a solar collector subsystem uses to supply heat for the thermodynamic cycle. In another embodiment, the solar collector subsystem can be replace by an HRVG (designated CSQ-21f not shown) similarly to the same way that CSQ-31 relates to CSQ-31s.

Computations of the present systems have shown that at ISO conditions (i.e., air temperature of 15° C. and relative humidity of 60%), the present system can achieve net efficiencies of up to 45%, which is substantially higher than the efficiency of base-load supercritical Rankine cycle systems, which has efficiencies of at best 42%.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A system for power generation comprising:
    a thermodynamic cycle including three interacting internal subcycles, where each cycle comprising a plurality of streams of different compositions of a multi-component fluid,
    a heat generator subsystem, where the subsystem fully vaporizes and superheats a richer working solution stream and a leaner working solution stream,
    a heat conversion subsystem including a lower pressure turbine and a higher pressure turbine, where the higher pressure turbine converts a portion of heat from the fully vaporized and superheated leaner working solution stream and the lower pressure turbine converts a portion of heat from the fully vaporized and superheated richer working solution stream,
    a heat exchange subsystem including at least five heat exchange units, where the heat transfer units transfer heat from a spent richer working solution stream and condensing solution substreams to a basic rich solution stream and a lean solution substream,
    a condenser for fully condense a basic rich solution stream using an external coolant stream,
    a separator subsystem, where the separator subsystem separates partially condensed streams into a rich vapor stream and a lean liquid stream,
    four pumps for increasing a pressure of four streams, and mixing and splitting valves for splitting and combining stream,
    where all streams are derived from a multi-component fluid and
    where the first internal cycle comprises circulating of a spent leaner working solution substream through a heat exchange unit HE6 and the heat generator subsystem and then into the higher pressure turbine,
    where the second internal cycle comprises circulating a upcoming leaner working solution stream through a heat exchange unit HE4, the heat exchange unit HE6 and heat generator subsystem and then into the higher pressure turbine,
    where the first and second internal cycles utilize the leaner working solution which combine to generate a first quantity of useable energy,
    where the third and main internal cycle comprises a basic rich solution stream, which passes through the three heat exchange units HE2, HE3, an HE5 to vaporize and superheat the basic rich solution stream, which is then mixed with a leaner working solution substream to form a richer working solution stream, the richer working solution stream then passes through the heat generator subsystem and then into a lower pressure turbine to generate a second quantity of useable energy, and
    where the first and second internal cycles reject their heat in such a way that it is fully recuperated by the third and main internal cycle, whereas heat rejected by the main internal cycle is reject into the ambient in the condenser heat exchange unit in counterflow with an external coolant stream.

2. The system of claim 1, wherein the heat generator subsystem includes a heat recovery vapor generator subsystem utilizing a hot heat source stream, a solar generator subsystem utilizing a heat transfer fluid, a solar generator subsystem or a combination thereof to indirectly or directly fully vaporize and superheat the richer and leaner working solution streams.

3. The system of claim 2, wherein the solar generator subsystem including two solar collectors and two heat exchange units, where the two solar collectors heat a heat transfer fluid which in turn vaporizes and superheats the richer working solution and the lean working solution streams.

4. The system of claim 1, wherein the heat generator subsystem includes:
    a first separator S1, a second separator S2, and a scrubber SCR, where the first separator S1 separates a partially condense condensing solution stream into a vapor S1 rich solution stream and a liquid S1 lean solution stream, the second separator S2 into a vapor S2 rich solution stream and a liquid S2 lean solution stream, and the scrubber SCR mixes a vapor S1 rich solution substream and a liquid S2 lean solution stream to form a vapor SCR rich solution stream and a liquid SCR lean solution stream.

5. The system of claim 1, wherein the heat generator subsystem includes:
    a separator, where the separator separates a partially condensed condensing solution stream into a vapor rich solution stream and a liquid lean solution stream.

6. The system of claim 1, wherein the multi-component fluid comprises:
    an ammonia-water mixture, a mixture of two or more hydrocarbons, a mixture of two or more freon, or a mixture of hydrocarbons and freon.

7. The system of claim 1, wherein the multi-component fluid comprises:
    mixtures of any number of compounds with favorable thermodynamic characteristics and solubility.

8. The system of claim 1, wherein the multi-component fluid comprises:
    a mixture of water and ammonia.

9. A method for power generation comprising:
    fully condensing a basic rich solution stream in a first heat exchange unit HE1 using an external coolant stream to form a fully condensed basic rich solution stream and a spent external coolant stream,
    increasing a pressure of the fully condensed basic rich solution stream in a first pump P1 to form a higher pressure fully condensed basic rich solution stream,
    preheating the higher pressure fully condensed basic rich solution stream with heat from a basic rich solution stream in a second heat exchange unit HE2 to form a preheated higher pressure basic rich solution stream and a partially condensed S1 rich solution stream,
    heating the preheated higher pressure basic rich solution stream with heat from a first condensing solution substream in a third heat exchange unit HE3 to form a heated higher pressure basic rich solution stream and a partially condensed first condensing solution substream,
    fully vaporizing and superheating the heated higher pressure basic rich solution stream with heat from a spent working solution stream in a fifth heat exchange unit HE5 to form a fully vaporized and superheated higher pressure basic rich solution stream and a cooled spent richer working solution stream,
    combining the fully vaporized and superheated higher pressure basic rich solution stream with a first spent leaner working solution substream to form a richer working solution stream,
    superheating the richer working solution stream in a heat generator subsystem to form a fully vaporized and superheated richer working solution stream, converting a portion of heat in the vaporized and superheated richer working solution stream in a lower pressure turbine T2 to a second quantity of a useable form of energy to form the spent richer working solution stream, combining the cooled spent richer working solution stream with a higher pressure first S1 lean solution substream to form a condensing solution stream, dividing the condensing solution stream into the first condensing solution substream and a second condensing solution substream, preheating a higher pressure leaner working solution stream with heat from the second condensing solution substream in a fourth heat exchange unit HE4 to form a partially condensed second condensing solution substream and a preheated higher pressure leaner working solution stream, combining the first and second partially condensed condensing solution substreams to form a partially condensed combined condensing solution stream, separating the partially condensed combined condensing solution stream in a first separator S1 to form a vapor S1 rich solution stream and a liquid S1 lean solution stream, dividing the vapor S1 rich solution stream into a first vapor S1 rich solution substream and a second vapor S1 rich solution substream and the liquid S1 lean solution stream into a first liquid S1 lean solution substream and a second liquid S1 lean solution substream, increasing a pressure of the first S1 lean solution substream in a third pump P3 to form the higher pressure first S1 lean solution substream, separating the partially condensed S1 rich solution stream in a second separator S2 to form a vapor S2 rich solution stream and a liquid S2 lean solution stream, dividing the liquid S2 lean solution stream into a first liquid S2 lean solution substream and a second liquid S2 lean solution substream, combining the second liquid S2 lean solution substream with the vapor S2 rich solution stream to form an intermediate solution stream, scrubbing the first liquid S2 lean solution substream with the second vapor S1 rich solution stream in a scrubber SCR to form a vapor SCR rich solution stream and a liquid SCR lean solution stream, combining the vapor SCR rich solution stream with the intermediate solution stream to form the basic rich solution stream, combining the liquid SCR lean solution stream with the second S1 lean solution stream to form a leaner working solution stream, increasing a pressure of the leaner working fluid stream in a second pump P2 to form a higher pressure leaner working solution stream, combining the preheated higher pressure leaner working solution stream with a cooled second spent leaner solution substream to form an increased flow rate, higher pressure leaner working solution stream, increasing a pressure of the increased flow rate, higher pressure leaner working solution stream in a fifth pump P5 to from a high pressure, increased flow rate leaner working solution stream, heating the high pressure, increased flow rate leaner working solution stream with heat from a spent second leaner solution substream to form the cooled second spent leaner solution substream and a heated high pressure, increased flow rate leaner working solution stream, fully vaporizing and superheating the heated high pressure, increased flow rate leaner working solution stream in the heat generator subsystem to form a fully vaporized and superheated leaner working solution stream, passing the fully vaporized and superheated leaner working solution stream through an addition valve or throttle control valve TV to adjust a pressure of the fully vaporized and superheated leaner working solution stream to form a pressure adjusted fully vaporized and superheated leaner working solution stream, converting a portion to heat in the pressure adjusted fully vaporized and superheated leaner working solution stream in a higher pressure turbine T2 into a first quantity of a useable form of energy to form a spent leaner working solution stream, and dividing the spent leaner working solution stream into the first and second spent leaner working solution substreams, where all streams are derived from a multi-component fluid and where method comprises a closed thermodynamic cycle including three interacting internal subcycles, each cycle comprising a plurality of streams of different compositions of a multi-component fluid, where the first internal cycle comprises circulating of a spent leaner working solution substream through a heat exchange unit HE6 and the heat generator subsystem and then into the higher pressure turbine, where the second internal cycle comprises circulating a upcoming leaner working solution stream through a heat exchange unit HE4, the heat exchange unit HE6 and heat generator subsystem and then into the higher pressure turbine, where the first and second internal cycles utilize the leaner working solution which combine to generate a first quantity of useable energy, where the third and main internal cycle comprises a basic rich solution stream, which passes through the three heat exchange units HE2, HE3, an HE5 to vaporize and superheat the basic rich solution stream, which is then mixed with a leaner working solution substream to form a richer working solution stream, the richer working solution stream then passes through the heat generator subsystem and then into a lower pressure turbine to generate a second quantity of useable energy, and where the first and second internal cycles reject their heat in such a way that it is fully recuperated by the third and main internal cycle, whereas heat rejected by the main internal cycle is reject into the ambient in the condenser heat exchange unit in counterflow with an external coolant stream.

10. The method of claim 9, wherein the heat generator subsystem includes a heat recovery vapor generator subsystem utilizing a hot heat source stream, a solar generator subsystem utilizing a heat transfer fluid, a solar generator subsystem or a combination thereof to indirectly or directly fully vaporize and superheat the richer and leaner working solution streams.

11. The method of claim 10, wherein the solar generator subsystem including two solar collectors and two heat exchange units, where the two solar collectors heat a heat transfer fluid which in turn vaporizes and superheats the richer working solution and the lean working solution streams.

12. The method of claim 9, wherein the heat generator subsystem includes:

a first separator S1, a second separator S2, and a scrubber SCR, where the first separator S1 separates a partially condense condensing solution stream into a vapor S1 rich solution stream and a liquid S1 lean solution stream, the second separator S2 into a vapor S2 rich solution stream and a liquid S2 lean solution stream, and the scrubber SCR mixes a vapor S1 rich solution substream and a liquid S2 lean solution stream to form a vapor SCR rich solution stream and a liquid SCR lean solution stream.

13. The method of claim 9, wherein the heat generator subsystem includes:
a separator, where the separator separates a partially condensed condensing solution stream into a vapor rich solution stream and a liquid lean solution stream.

14. The method of claim 9, wherein the multi-component fluid comprises:
an ammonia-water mixture, a mixture of two or more hydrocarbons, a mixture of two or more freon, or a mixture of hydrocarbons and freon.

15. The method of claim 9, wherein the multi-component fluid comprises:
mixtures of any number of compounds with favorable thermodynamic characteristics and solubility.

16. The method of claim 9, wherein the multi-component fluid comprises:
a mixture of water and ammonia.

17. A method for power generation comprising:
fully condensing a cooled basic rich solution stream in a first heat exchange unit HE1 using an external coolant stream to form a fully condensed basic rich solution stream and a spent external coolant stream,
increasing a pressure of the fully condensed basic rich solution stream in a first pump P1 to form a higher pressure fully condensed basic rich solution stream,
preheating the higher pressure fully condensed basic rich solution stream with heat from a basic rich solution stream in a second heat exchange unit HE2 to form a preheated higher pressure basic rich solution stream and the cooled basic rich solution stream,
heating the preheated higher pressure basic rich solution stream with heat from a first condensing solution substream in a third heat exchange unit HE3 to form a heated higher pressure basic rich solution stream and a partially condensed first condensing solution substream,
fully vaporizing and superheating the heated higher pressure basic rich solution stream with heat from a spent working solution stream in a fifth heat exchange unit HE5 to form a fully vaporized and superheated higher pressure basic rich solution stream and a cooled spent richer working solution stream,
combining the fully vaporized and superheated higher pressure basic rich solution stream with a first spent leaner working solution substream to form a richer working solution stream,
superheating the richer working solution stream in a heat generator subsystem to form a fully vaporized and superheated richer working solution stream,
converting a portion of heat in the vaporized and superheated richer working solution stream in a lower pressure turbine T2 to a second quantity of a useable form of energy to form the spent richer working solution stream,
combining the cooled spent richer working solution stream with a higher pressure first S1 lean solution substream to form a condensing solution stream,
dividing the condensing solution stream into the first condensing solution substream and a second condensing solution substream,
preheating a higher pressure leaner working solution stream with heat from the second condensing solution substream in a fourth heat exchange unit HE4 to form a partially condensed second condensing solution substream and a preheated higher pressure leaner working solution stream,
combining the first and second partially condensed condensing solution substreams to form a partially condensed combined condensing solution stream,
separating the partially condensed combined condensing solution stream in a first separator S1 to form a vapor S1 rich solution stream and a liquid S1 lean solution stream,
dividing the liquid S1 lean solution stream into a first liquid S1 lean solution substream, a second S1 lean solution substream and a third liquid S1 lean solution substream,
increasing a pressure of the first S1 lean solution substream in a third pump P3 to form the higher pressure first S1 lean solution substream,
increasing a pressure of the second S1 lean solution substream in a second pump P2 to form a higher pressure leaner working solution stream,
combining the third S1 lean solution stream with the vapor S1 rich solution steam to form the basic rich solution stream,
combining the preheated higher pressure leaner working solution stream with a cooled second spent leaner solution substream to form an increased flow rate, higher pressure leaner working solution stream,
increasing a pressure of the increased flow rate, higher pressure leaner working solution stream in a fifth pump P5 to from a high pressure, increased flow rate leaner working solution stream,
heating the high pressure, increased flow rate leaner working solution stream with heat from a spent second leaner solution substream to form the cooled second spent leaner solution substream and a heated high pressure, increased flow rate leaner working solution stream,
fully vaporizing and superheating the heated high pressure, increased flow rate leaner working solution stream in the heat generator subsystem to form a fully vaporized and superheated leaner working solution stream,
passing the fully vaporized and superheated leaner working solution stream through an addition valve or throttle control valve TV to adjust a pressure of the fully vaporized and superheated leaner working solution stream to form a pressure adjusted fully vaporized and superheated leaner working solution stream,
converting a portion to heat in the pressure adjusted fully vaporized and superheated leaner working solution stream in a higher pressure turbine T2 into a first quantity of a useable form of energy to form a spent leaner working solution stream, and
dividing the spent leaner working solution stream into the first and second spent leaner working solution substreams,
where all streams are derived from a multi-component fluid and
where method comprises a closed thermodynamic cycle including three interacting internal subcycles, each cycle comprising a plurality of streams of different compositions of a multi-component fluid,
where the first internal cycle comprises circulating of a spent leaner working solution substream through a heat exchange unit HE6 and the heat generator subsystem and then into the higher pressure turbine,
where the second internal cycle comprises circulating a upcoming leaner working solution stream through a heat exchange unit HE4, the heat exchange unit HE6 and heat generator subsystem and then into the higher pressure turbine, where the first and second internal cycles utilize the leaner working solution which combine to generate a first quantity of useable energy, where the third and main internal cycle comprises a basic rich solution stream, which passes through the three heat exchange units HE2, HE3, an HE5 to vaporize and superheat the basic rich solution stream, which is then mixed with a leaner working solution substream to form a richer working solution stream, the richer working solution stream then passes through the heat generator subsystem and then into a lower pressure turbine to generate a second quantity of useable energy, and where the first and second internal cycles reject their heat in such a way that it is fully recuperated by the third and main internal cycle, whereas heat rejected by the main internal cycle is reject into the ambient in the condenser heat exchange unit in counterflow with an external coolant stream.

18. The system of claim 17, wherein the heat generator subsystem includes a heat recovery vapor generator subsystem utilizing a hot heat source stream, a solar generator subsystem utilizing a heat transfer fluid, a solar generator subsystem or a combination thereof to indirectly or directly fully vaporize and superheat the richer and leaner working solution streams.

19. The system of claim 18, wherein the solar generator subsystem including two solar collectors and two heat exchange units, where the two solar collectors heat a heat transfer fluid which in turn vaporizes and superheats the richer working solution and the lean working solution streams.

20. The system of claim 17, wherein the heat generator subsystem includes:

a first separator S1, a second separator S2, and a scrubber SCR, where the first separator S1 separates a partially condense condensing solution stream into a vapor S1 rich solution stream and a liquid S1 lean solution stream, the second separator S2 into a vapor S2 rich solution stream and a liquid S2 lean solution stream, and the scrubber SCR mixes a vapor S1 rich solution substream and a liquid S2 lean solution stream to form a vapor SCR rich solution stream and a liquid SCR lean solution stream.

21. The system of claim 17, wherein the heat generator subsystem includes:

a separator, where the separator separates a partially condensed condensing solution stream into a vapor rich solution stream and a liquid lean solution stream.

22. The system of claim 17, wherein the multi-component fluid comprises:

an ammonia-water mixture, a mixture of two or more hydrocarbons, a mixture of two or more freon, or a mixture of hydrocarbons and freon.

23. The system of claim 17, wherein the multi-component fluid comprises:

mixtures of any number of compounds with favorable thermodynamic characteristics and solubility.

24. The system of claim 17, wherein the multi-component fluid comprises:

a mixture of water and ammonia.

* * * * *